US012632207B2

(12) United States Patent　　　　　(10) Patent No.:　US 12,632,207 B2
Chen et al.　　　　　　　　　　　　　(45) Date of Patent:　May 19, 2026

(54) DISPLAYING A REMOTE ATTENDEE ON A LOCAL DISPLAY DEVICE AT A POSITION THEREON BASED ON THE REMOTE ATTENDEE'S VIEWING DIRECTION

(71) Applicant: Lenovo (United States) Inc., Morrisville, NC (US)

(72) Inventors: Yujia Chen, Durham, NC (US); Matthew Tucker, Chapel Hill, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 1 day.

(21) Appl. No.: 18/824,229

(22) Filed: Sep. 4, 2024

(65) Prior Publication Data

US 2026/0064352 A1　Mar. 5, 2026

(51) Int. Cl.
　　*G06F 3/14*　　　(2006.01)
　　*G06F 3/01*　　　(2006.01)
(52) U.S. Cl.
　　CPC ............ *G06F 3/1454* (2013.01); *G06F 3/012* (2013.01); *G06F 3/013* (2013.01)
(58) Field of Classification Search
　　CPC ...... G06F 3/011; G06F 3/017; G06F 3/04815; G06F 3/04817; G06F 3/04842; G06F 3/0485; G06F 3/167; G06F 2203/04803; G06T 13/40; G06T 19/006; G06T 19/20;

G06T 2219/2004; G06T 2219/2016; H04L 65/403; H04L 67/10; H04L 67/131; H04L 67/142; H04L 67/52; H04L 67/535; H04N 7/157

See application file for complete search history.

(56) References Cited

U.S. PATENT DOCUMENTS

| | | | |
|---|---|---|---|
| 2019/0313059 A1* | 10/2019 | Agarawala | .............. G06F 3/011 |
| 2022/0277565 A1* | 9/2022 | Haro | ..................... G06T 19/006 |
| 2024/0089411 A1* | 3/2024 | Goetzinger | ............ H04N 7/142 |

* cited by examiner

*Primary Examiner* — Nelson M Rosario
(74) *Attorney, Agent, or Firm* — Kunzler Needham Hilton

(57)　　　　　　ABSTRACT

Systems for displaying a user on a remote display device at a position thereon based on the user's viewing direction are disclosed. One system includes a processor and memory. The memory includes processor-executable instructions that cause the apparatus to receive multiple inputs from an attendee device that is located in a first real-world environment that is located remotely from a second real-world environment in which each input corresponds to a respective direction in the second real-world environment where a user of the attendee device desires to view via the attendee device and, in response to receiving each input, display the user on a display device at a respective position on the display device corresponding to the respective direction in the second real-world environment where the user desires to view. Methods and computer program products that include and/or perform the operations and/or functions of the system and/or apparatus are also disclosed.

20 Claims, 17 Drawing Sheets

100C

SCREEN 304

402

SCREEN 304

402

800

RECEIVE A PLURALITY OF INPUTS THAT CORRESPOND TO DIRECTIONS IN A REAL-WORLD ENVIRONMENT WHERE A REMOTE USER DESIRES TO VIEW    802

DISPLAY THE REMOTE USER AT RESPECTIVE POSITIONS ON A DISPLAY CORRESPONDING TO THE REAL-WORLD DIRECTIONS THE REMOTE USER DESIRES TO VIEW    804

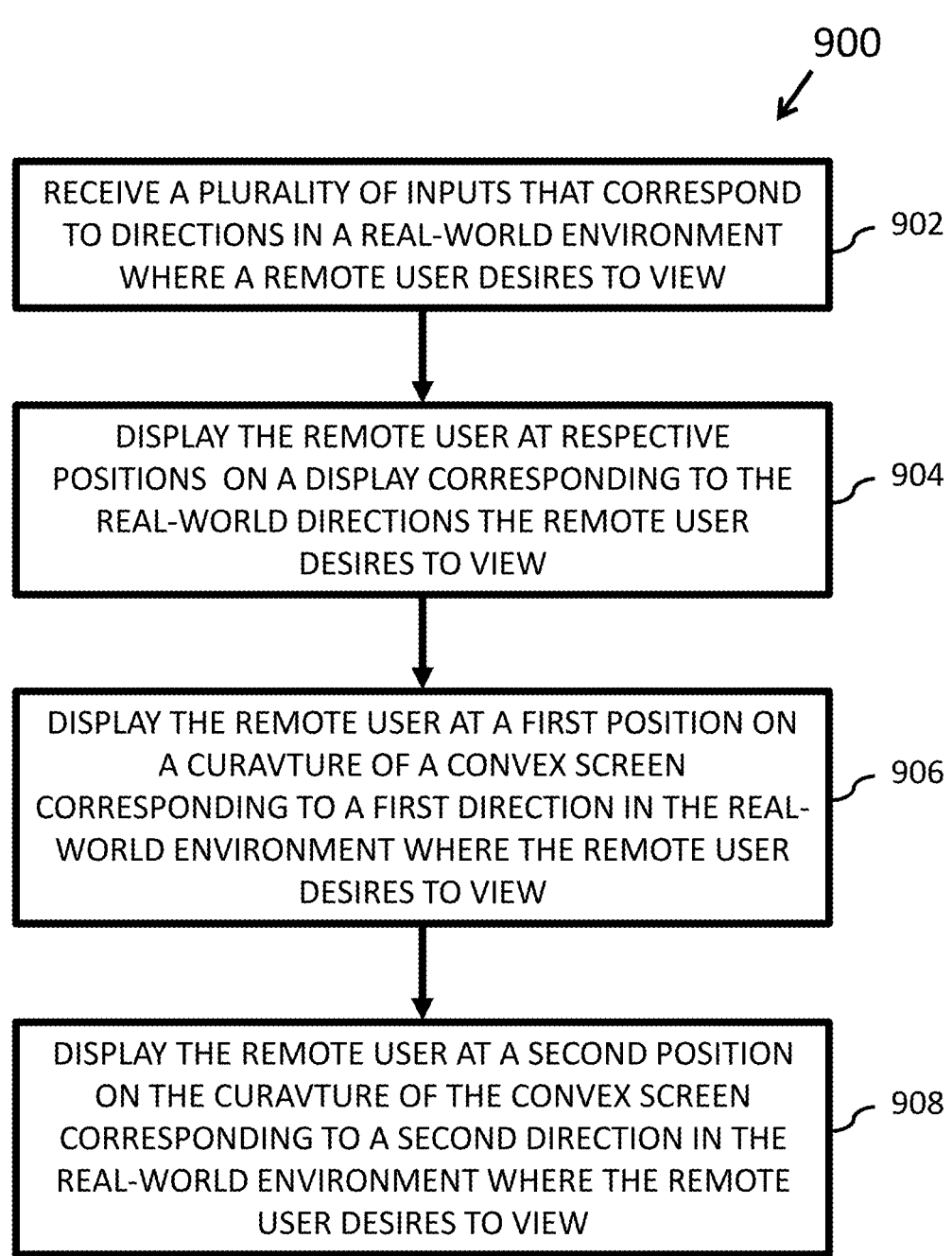

900

RECEIVE A PLURALITY OF INPUTS THAT CORRESPOND TO DIRECTIONS IN A REAL-WORLD ENVIRONMENT WHERE A REMOTE USER DESIRES TO VIEW — 902

DISPLAY THE REMOTE USER AT RESPECTIVE POSITIONS ON A DISPLAY CORRESPONDING TO THE REAL-WORLD DIRECTIONS THE REMOTE USER DESIRES TO VIEW — 904

DISPLAY THE REMOTE USER AT A FIRST POSITION ON A CURAVTURE OF A CONVEX SCREEN CORRESPONDING TO A FIRST DIRECTION IN THE REAL-WORLD ENVIRONMENT WHERE THE REMOTE USER DESIRES TO VIEW — 906

DISPLAY THE REMOTE USER AT A SECOND POSITION ON THE CURAVTURE OF THE CONVEX SCREEN CORRESPONDING TO A SECOND DIRECTION IN THE REAL-WORLD ENVIRONMENT WHERE THE REMOTE USER DESIRES TO VIEW — 908

FIG. 9

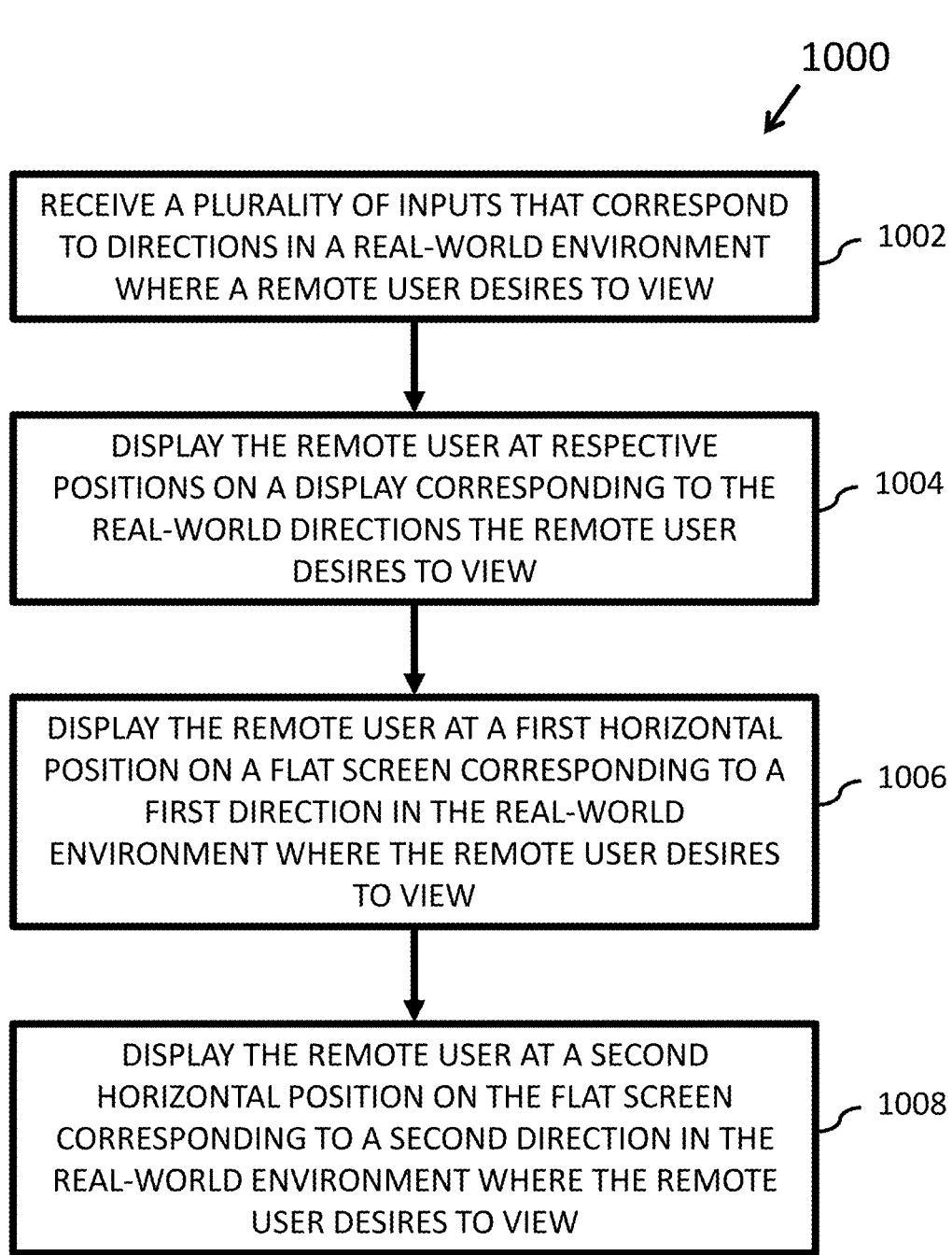

1000

RECEIVE A PLURALITY OF INPUTS THAT CORRESPOND TO DIRECTIONS IN A REAL-WORLD ENVIRONMENT WHERE A REMOTE USER DESIRES TO VIEW ⟩ 1002

DISPLAY THE REMOTE USER AT RESPECTIVE POSITIONS ON A DISPLAY CORRESPONDING TO THE REAL-WORLD DIRECTIONS THE REMOTE USER DESIRES TO VIEW ⟩ 1004

DISPLAY THE REMOTE USER AT A FIRST HORIZONTAL POSITION ON A FLAT SCREEN CORRESPONDING TO A FIRST DIRECTION IN THE REAL-WORLD ENVIRONMENT WHERE THE REMOTE USER DESIRES TO VIEW ⟩ 1006

DISPLAY THE REMOTE USER AT A SECOND HORIZONTAL POSITION ON THE FLAT SCREEN CORRESPONDING TO A SECOND DIRECTION IN THE REAL-WORLD ENVIRONMENT WHERE THE REMOTE USER DESIRES TO VIEW ⟩ 1008

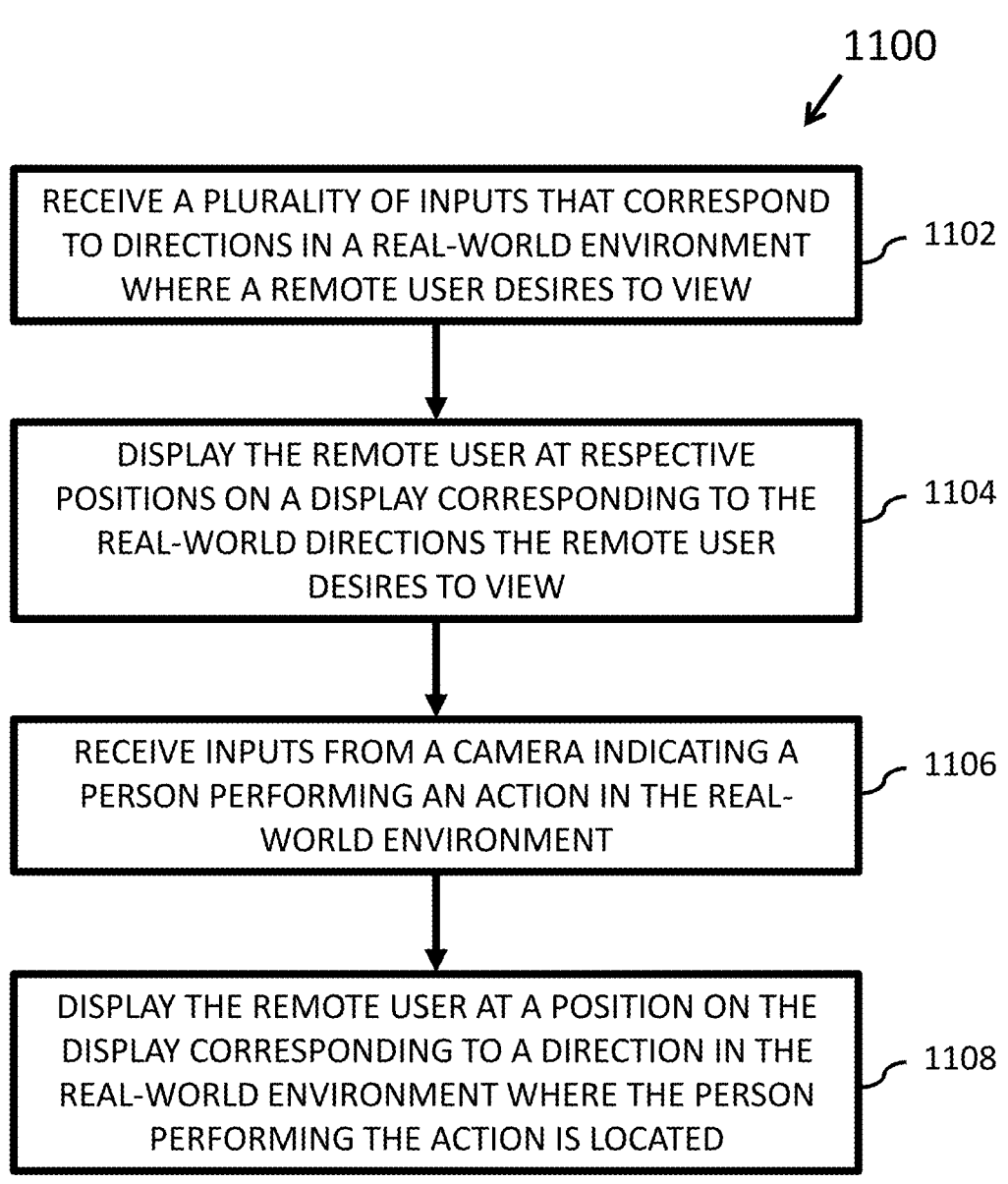

RECEIVE A PLURALITY OF INPUTS THAT CORRESPOND TO DIRECTIONS IN A REAL-WORLD ENVIRONMENT WHERE A REMOTE USER DESIRES TO VIEW — 1102

DISPLAY THE REMOTE USER AT RESPECTIVE POSITIONS ON A DISPLAY CORRESPONDING TO THE REAL-WORLD DIRECTIONS THE REMOTE USER DESIRES TO VIEW — 1104

RECEIVE INPUTS FROM A CAMERA INDICATING A PERSON PERFORMING AN ACTION IN THE REAL-WORLD ENVIRONMENT — 1106

DISPLAY THE REMOTE USER AT A POSITION ON THE DISPLAY CORRESPONDING TO A DIRECTION IN THE REAL-WORLD ENVIRONMENT WHERE THE PERSON PERFORMING THE ACTION IS LOCATED — 1108

FIG. 11

DISPLAYING A REMOTE ATTENDEE ON A LOCAL DISPLAY DEVICE AT A POSITION THEREON BASED ON THE REMOTE ATTENDEE'S VIEWING DIRECTION

FIELD

The subject matter disclosed herein relates in general to live streaming and, more particularly, relates to displaying a remote attendee on a local display device at a position thereon based on the remote attendee's viewing direction.

DESCRIPTION OF THE RELATED ART

Live streaming sessions typically include channels with live video components. In hybrid live streaming sessions, multiple participants can be located at and/or reside in a real-world location (e.g., a conference room, a classroom, a sporting event, and/or the like), while one or more participants are located remotely from the real-world location. Currently available hybrid live streaming technologies typically include remote participants being shown on a screen at a fixed position in the real-world location. For example, a remote participant might be shown on a screen at the front of a conference room with a camera mounted to the bottom of the screen where the remote participant's point of view is distanced from the other attendees of the event. In this scenario, remote participants may feel more distanced from the event and/or less included in the happenings of the event than otherwise possible.

BRIEF SUMMARY

Systems that can display a remote attendee on a local display device at a position thereon based on the remote attendee's viewing direction are disclosed. One system includes an apparatus including a processor and a memory. The memory includes instructions executable by the processor to cause the apparatus to receive multiple inputs from an attendee device that is located in a first real-world environment that is located remotely from a second real-world environment in which each input corresponds to a respective direction in the second real-world environment where a user of the attendee device desires to view via the attendee device and, in response to receiving each input, display the user on a display device at a respective position on the display device corresponding to the respective direction in the second real-world environment where the user desires to view. Here, the display device can be located in the second real-world environment and the first real-world environment and the second real-world environment are different real-world environments.

Also disclosed are methods that can display a remote attendee on a local display device at a position thereon based on the remote attendee's viewing direction. One method includes receiving, from an attendee device that is located in a first real-world environment that is located remotely from a second real-world environment, a plurality of first inputs, wherein each first input corresponds to a respective direction in the second real-world environment where a user of the attendee device desires to view via the attendee device and, in response to receiving each first input, displaying the user on a display device at a respective position on the display device corresponding to the respective direction in the second real-world environment where the user desires to view. Here, the display device is located in the second real-world environment and the first real-world environment and the second real-world environment are different real-world environments.

Computer program products including a computer-readable storage device including code embodied therewith that can display a remote attendee on a local display device at a position thereon based on the remote attendee's viewing direction are further disclosed herein. The code is executable by a processor and causes the processor to receive, from an attendee device that is located in a first real-world environment that is located remotely from a second real-world environment, a plurality of first inputs, wherein each first input corresponds to a respective direction in the second real-world environment where a user of the attendee device desires to view via the attendee device and display the user on a display device at a respective position on the display device corresponding to the respective direction in the second real-world environment where the user desires to view in response to receiving each first input. Here, the display device is located in the second real-world environment and the first real-world environment and the second real-world environment are different real-world environments.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 8 through 11 are schematic flow chart diagrams illustrating various embodiment of a method for displaying a user on a remote display device at a position based on the user's viewing direction.

DETAILED DESCRIPTION

Figure 1A:
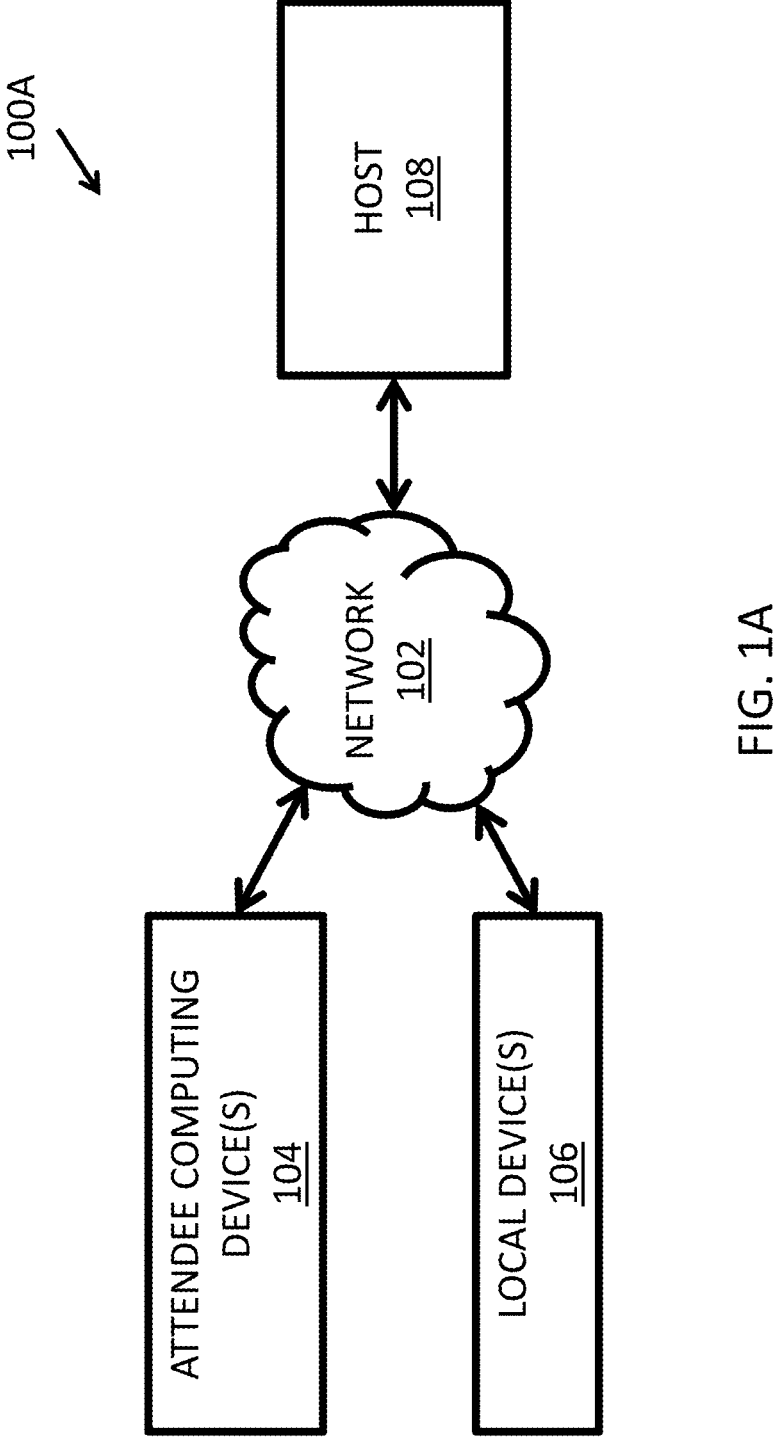
FIGS. 1A, 1B and 1C are schematic block diagrams of various embodiments of a computing system that can display a user on a remote display device at a position based on the user's viewing direction.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms, "including," "comprising," "having," and variations thereof mean, "including but not limited to," unless expressly specified otherwise. An enumerated listing of items does not imply that any or all of the items are mutually exclusive, unless expressly specified otherwise. The terms "a," "an," and, "the," also refer to, "one or more," unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of, "and/or," includes any single item in the list or a combination of items in the list. For example, a list of A, B and/or C includes only A, only B, only C, a combination of A and B, a combination of B and C, a combination of A and C or a combination of A, B and C. As used herein, a list using the terminology, "one or more of," includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C," includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof," includes only A, only B, only C, a combination of A and B, a combination of B and C, a combination of A and C or a combination of A, B and C.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Various embodiments provide systems, methods, and computer program products that can display a remote attendee on a local display device at a position thereon based on the remote attendee's viewing direction are disclosed. One system includes an apparatus including a processor and a memory. The memory, in various embodiments, includes instructions executable by the processor to cause the apparatus to receive multiple inputs from an attendee device that is located in a first real-world environment that is located remotely from a second real-world environment in which each input corresponds to a respective direction in the second real-world environment where a user of the attendee device desires to view via the attendee device. In some embodiments, the instructions executable by the processor further cause the apparatus to display the user on a display device at a respective position on the display device corresponding to the respective direction in the second real-world environment where the user desires to view in response to receiving each input. In certain embodiments, the display device can be located in the second real-world environment and the first real-world environment and the second real-world environment are different real-world environments.

One method includes receiving, from an attendee device that is located in a first real-world environment that is located remotely from a second real-world environment, a plurality of first inputs in which each first input corresponds to a respective direction in the second real-world environment where a user of the attendee device desires to view via the attendee device. Various embodiments of the method also include displaying the user on a display device at a respective position on the display device corresponding to the respective direction in the second real-world environment where the user desires to view in response to receiving each first input in response to receiving each first input. In certain embodiments, the display device can be located in the second real-world environment and the first real-world environment and the second real-world environment are different real-world environments.

Various embodiments of a computer program products include a computer-readable storage device including code embodied therewith. The code is executable by a processor and causes the processor to receive, from an attendee device that is located in a first real-world environment that is located remotely from a second real-world environment, a plurality of first inputs, wherein each first input corresponds to a respective direction in the second real-world environment where a user of the attendee device desires to view via the attendee device and display the user on a display device at a respective position on the display device corresponding to the respective direction in the second real-world environment where the user desires to view in response to receiving each first input. In certain embodiments, the display device can be located in the second real-world environment and the first real-world environment and the second real-world environment are different real-world environments.

With reference to the drawings, FIG. 1A is a schematic block diagram of one embodiment of a computing system 100A that can display a remote attendee on a local display device at a position thereon based on the remote attendee's viewing direction. At least in the illustrated embodiment, the computing system 100A includes, among other components, a network 102 connecting a set of one or more attendee computing devices 104 (also simply referred individually, in various groups, or collectively as attendee computing device(s) 104), a set of one or more local devices 106 (also simply referred individually, in various groups, or collectively as local device(s) 104), and a host computing device 108 (or simply, host 108) to one another.

The network 102 may include any suitable wired and/or wireless network 102 (e.g., public and/or private computer networks in any number and/or configuration (e.g., the Internet, an intranet, a cloud network, etc.)) that is known or developed in the future that enables the set of attendee computing devices 104, the set of local devices 106, and the host 108 to be coupled to and/or in communication with one another and/or to share resources. In various embodiments, the network 102 can include, among other technologies, the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating (e.g., digital environment) with one another that are possible, each of which is contemplated herein.

An attendee computing device 104 may include any suitable computing system and/or computing device capable of accessing and/or communicating with one another, the local device(s) 104, and with the host 106 the via the network 102. Examples of an attendee computing device 104 include, but are not limited to, a laptop computer, a desktop computer, a virtual reality (VR) headset, an augmented reality (AR) headset, smart glasses, a personal digital assistant (PDA), a tablet or tablet computer, a smart phone, a cellular phone, a smart television (e.g., televisions connected to the Internet), a wearable, an Internet of Things (IoT) device, a game console, a vehicle on-board computer, a streaming device, a smart device, and a digital assistant, etc., among other computing devices that are possible, each of which is contemplated herein.

Computing system 100 may include any suitable quantity of attendee computing devices 104. That is, while computing system 100 is illustrated in FIG. 1A as including one (1) attendee computing device 104, the various embodiments of the computing system 100 are not limited to a single attendee computing device 104. Rather, various other embodiments of the computing system 100 may include any suitable quantity of attendee computing devices 104 greater than one attendee computing device 104.

In various embodiments, an attendee computing device 104 can include a computing device used by a user or a participant of an event occurring in a real-world environment (e.g., an office, a room, etc.). In additional embodiments, a computing device used by a moderator of an event occurring in a real-world environment can be considered an attendee computing device 104. Further, as used herein, the terms attendee, participant, and/or user can be referred to interchangeably and/or can include the same meaning.

Figure 2A:
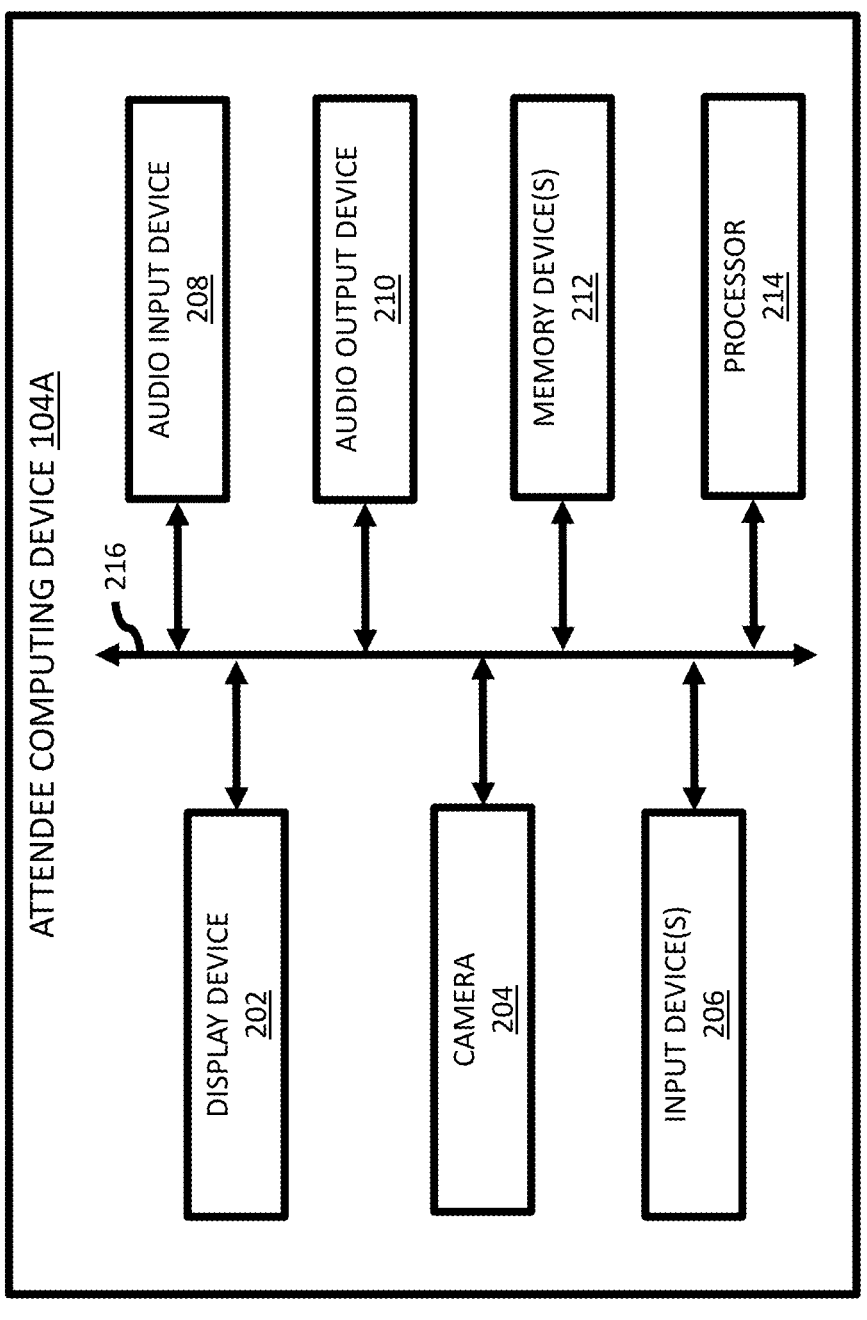
FIGS. 2A and 2B are schematic block diagrams of various embodiments of a remote attendee computing device included in the computing systems of FIGS. 1A through 1C.

With reference to FIG. 2A, FIG. 2A is a block diagram of one embodiment of an attendee computing device 104A. At least in the illustrated embodiment, the attendee computing device 104A includes, among other components, a display device 202, a camera 204, one or more input devices 206, an audio input device 208, an audio output device 210, one or more memory devices 212, and a processor 214 coupled to and/or in communication with one another via a bus 216 (e.g., a wired and/or wireless bus).

A display device 202 (or simply, display 202) may include any suitable device that is known or developed in the future capable of displaying images/data, video/data feeds, and/or video/data streams. Examples of a display 202 include, but are not limited to, a monitor (e.g., a wireless and/or wired), a touch screen (e.g., a wireless and/or wired), a television, a smart TV, a projector, a projection screen, and a combination projector/protection screen, etc., among other display devices and/or types of display devices that is/are known or developed in the future, each of which is contemplated herein.

In various embodiments, the display 202 may include an internal display or an external display. In some embodiments, the display 202 is configured to display a video/data feed of an attendee or user (e.g., colleague, student, worker, adult, child, etc.) and/or a moderator (e.g., an adult, a teacher, a boss, an individual in charge, etc.) of an event facilitated by a digital system (e.g., a video conference system, a video conference platform, digital environment application/software, a virtual classroom, a virtual meeting, a virtual learning system, a virtual learning platform, virtual learning application/software, a classroom management system, a classroom management platform, classroom management software/application, online learning system, online learning platform, online learning application/software, a distance learning system, a distance learning platform, distance learning application/software, etc., and/or the like digital environments or digital environments) while the event is in progress in a real-world location that is remote from the real-world location where the computing device 104A and/or display 202 currently resides.

A camera 204 may include any suitable device that is known or developed in the future capable of capturing and transmitting images, video feeds, and/or video streams. In various embodiments, the camera 204 includes at least one video camera.

The camera 204, in various embodiments, is configured to capture one or more images of and/or the movement(s) of a user of the attendee computing device 104A. In certain embodiments, the camera 202 is configured to capture and/or track the eye(s) and/or gaze of the user as the user interacts with the attendee computing device 104A and/or display 202. In this manner, the camera 204 can be considered to automatedly and/or automatically capture the image(s) and/or the movement(s) of the user of the attendee computing device 104A.

For example, various embodiments include the camera 204 tracking the eye(s) and/or gaze of the user to detect and/or determine where on the display 202 the user is currently looking. Here, the location on the display 202 where the user is currently looking can represent a location in the real-world environment where the user desires to view and/or an object (e.g., a person) that the user is focusing the user's gaze/eye(s) and/or attention.

The camera 204 is further configured to transmit a signal and/or notification to the processor 214 indicating where on the display device 202 the user is currently looking/focusing its gaze and/or where in the real-world environment the user desires to view. As discussed elsewhere herein, the processor 214 is configured to receive the signal and/or notification indicating where on the display device 202 the user is currently looking/focusing its gaze and/or where in the real-world environment the user desires to view.

An input device 206 may include any suitable device that is known or developed in the future capable of receiving user input. In various embodiments, the input device 206 includes a gyroscope, an accelerometer, a motion sensor, a mouse, a keyboard, a trackball, a joystick, a touchpad, and/or a touchscreen, etc., among other suitable input devices that is/are possible, each or which is contemplated herein.

In various embodiments, the user can utilize the input device 206 to indicate where on the display 202 the user is currently looking and/or desires to view. Here, the location on the display 202 where the user is currently looking or desires to view can represent a location in the real-world environment where the user desires to view and/or an object (e.g., a person) that the user desires to focus the user's gaze/eye(s) and/or attention. The input device(s) 206 is/are further configured to transmit a signal and/or notification indicating where on the display device 202 the user is currently looking and/or where in the real-world environment the user desires to view based on the user input(s).

For example, a sensor (e.g., a gyroscope, an accelerometer, a motion sensor, etc.) can automatedly and/or automatically detect the motion, direction, velocity, and/or acceleration at which a user is moving one or more parts of the user's body (e.g., head, hand(s), arm(s), leg(s), torso, etc.). For a VR/AR headset and/or smart glasses, for example, the sensor can detect and/or determine where in the real-world environment the user is currently looking using the motion, direction, velocity, and/or acceleration of the user's head (and/or eye(s)). Here, the direction where the user's head is currently facing can represent a location in the real-world environment where the user desires to view and/or an object (e.g., a person) that the user is currently focusing the user's attention.

In another non-limiting example, the user can utilize a mouse to manually move a cursor to a position on the display 202 that is displaying an attendee that is located at the real-world environment where the event is being held (e.g., a local attendee) and is currently speaking. Here, the use of the mouse and cursor can represent where user desires to focus the user's gaze/eye(s) and/or what the user wants to focus the user's attention, which is the local attendee that is currently speaking.

In yet another non-limiting example, the user can utilize the touchscreen technology of a touchscreen display 202 to manually indicate where or what in the real-world environment being displayed on the display 202 the user desires to view. Here, the user can touch a position/location on the display 202 to indicate where in the real-world environment being shown thereon the user desires to focus the user's gaze/eye(s) and/or what the user wants to focus the user's attention upon.

The input device 206 is further configured to transmit a signal and/or notification to the processor 214 indicating where on the display device 202 the user is currently looking/focusing its gaze and/or where in the real-world environment the user desires to view. As discussed elsewhere herein, the processor 214 is configured to receive the signal and/or notification indicating where on the display device 202 the user is currently looking/focusing its gaze and/or where in the real-world environment the user desires to view.

An audio input device 208 may include any suitable device that is known or developed in the future capable of capturing and transmitting audio/sound, audio feeds, and/or audio streams. In various embodiments, the audio input device 208 includes at least one microphone.

An audio output device 210 may include any suitable device that is known or developed in the future capable of receiving and providing audio/sound, audio feeds, and/or audio streams. In various embodiments, the audio output device 210 includes a speaker, a set of headphones, and/or a set of earbuds, etc., among other suitable audio output devices that are possible and contemplated herein.

A set of memory devices 212 may include any suitable quantity of memory devices 212. Further, a memory device 212 may include any suitable type of device and/or system that is known or developed in the future that can store computer-useable and/or computer-readable code. In various embodiments, a memory device 212 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 214).

A memory device 212, in some embodiments, includes volatile computer storage media. For example, a memory device 212 may include random access memory (RAM), including dynamic RAM (DRAM), synchronous dynamic RAM (SDRAM), and/or static RAM (SRAM). In other embodiments, a memory device 212 includes non-volatile computer storage media. For example, a memory device 212 may include a hard disk drive, a flash memory, and/or any other suitable non-volatile computer storage device that is known or developed in the future. In various embodiments, a memory device 212 includes both volatile and non-volatile computer storage media.

A processor 214 may include any suitable non-volatile/persistent hardware and/or software configured to perform and/or facilitate performing various processing functions and/or operations. In various embodiments, the processor 214 includes hardware and/or software for executing instructions in one or more modules and/or applications. The module(s) and/or application(s) executed by the processor 214 can be stored on and executed from a memory device 212 and/or from the processor 214.

In various embodiments, the processor 214 is configured to communicate with the host 106. In some embodiments, the processor 214 is configured to notify the host 106 where the user is currently looking and/or desires to look in the real-world environment of the event based on the eye(s) and/or gaze of the user with respect to the display 202 as tracked and detected/determined by the camera 204. For example, the camera 204 can notify the processor 214 where on the display device 202 the user is currently looking based on the eye(s)/gaze and the processor 214 can notify the host where on the display 202 the user is looking (or focusing its gaze) and/or where in the real-world environment the user is looking (or focusing its gaze) based on the notification received from the camera 204.

In additional or alternative embodiments, the processor 214 is configured to notify the host 106 where the user is currently looking and/or desires to look in the real-world environment of the event based on the one or more user inputs received via the input device(s) 206 with respect to the display 202. For example, the input device(s) 206 can notify the processor 214 where on the display device 202 the user is currently looking based on a user input (e.g., via a mouse click, a touch on a touchscreen, body part (e.g., head, hand(s), leg(s), torso, etc.) movement detected by a sensor (e.g., gyroscope, accelerometer, motion detector, etc.)) and the processor 214 can notify the host 106 where on the display 202 the user is looking (or focusing its gaze) and/or where in the real-world environment the user is looking (or focusing its gaze) based on the notification received from the input device(s) 206.

Figure 2B:
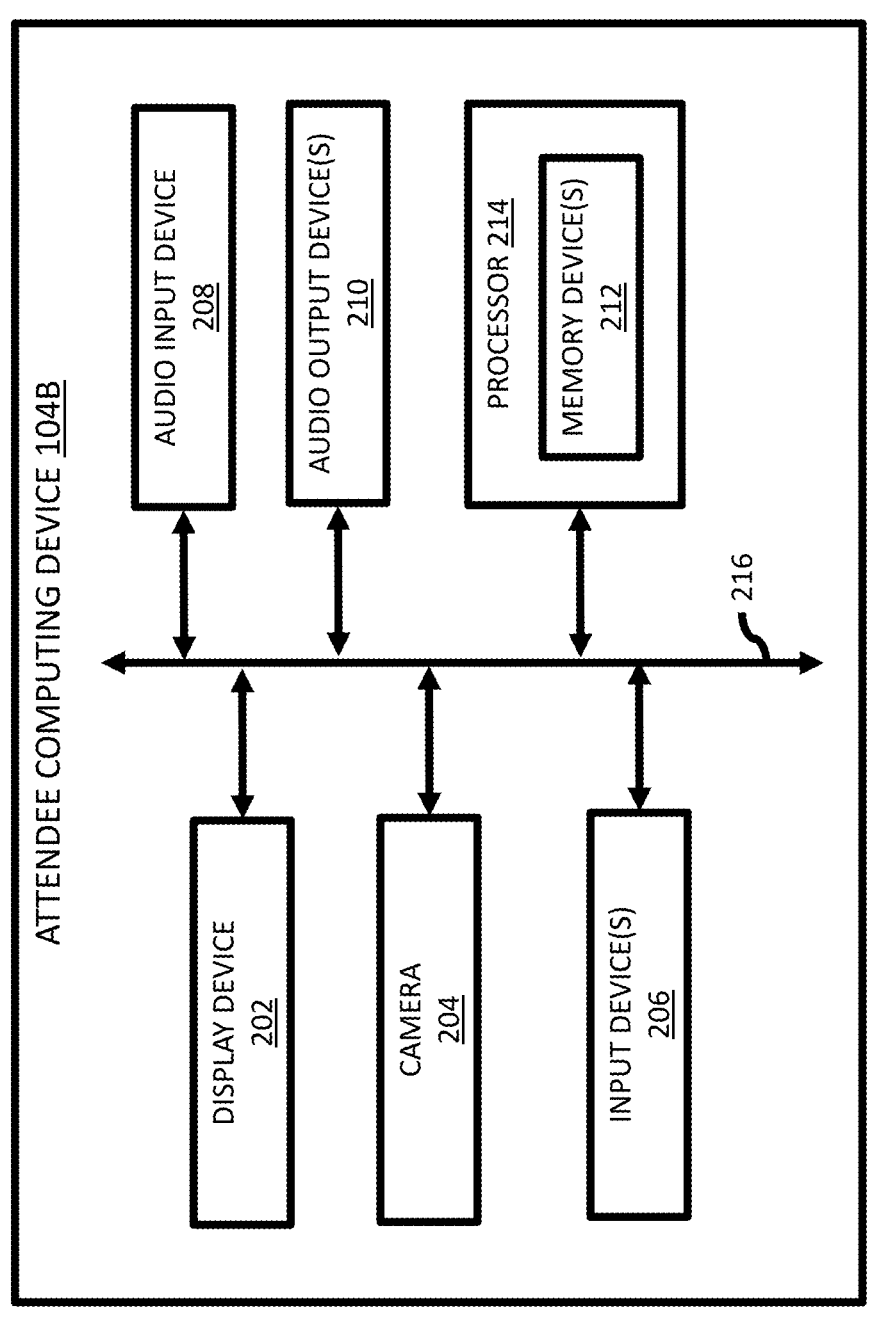

Referring to FIG. 2B, FIG. 2B is a block diagram of another embodiment of an attendee computing device 104B. The attendee computing device 104B includes, among other components, a display device 202, a camera 204, one or more input devices 206, an audio input device 208, an audio output device 210, one or more memory devices 212, and a processor 214 coupled to and/or in communication with one another via a bus 216, similar to the display device 202, camera 204, input device(s) 206, audio input device 208, audio output device 210, memory device(s) 212, and a processor 214 discussed with reference to the attendee computing device 104A illustrated in FIG. 2A. Alternative to the attendee computing device 104A, the processor 214 in the attendee computing device 104B includes the memory device(s) 212 as opposed to the memory device(s) 212 of the attendee computing device 104A being a different device than and/or independent of the processor 214.

With reference back to FIG. 1A, a local device 106 may include any suitable device that is capable of displaying the user of the remote attendee computing device 104 thereon. The local device 106 may include any suitable size (e.g., dimensions, length, width, height, etc.) and/or shape that is known or developed in the future.

In various embodiments, the local device 106 is configured to be placed on a surface (e.g., a table, a desk, a shelf, a counter, a platform, etc.) that is eye level with one or more persons (e.g., attendee(s)) in the real-world environment where the event is occurring. For example, the local device 106 can be configured (e.g., include any suitable dimension(s), length(s), width(s), height(s), and/or shape(s)) for placement on a conference table in a conference room during a video conference so that the user of the remote attendee computing device, when displayed on the local device 106, is at or appears to be at eye level or approximately at eye level with one or more attendees (e.g., local attendee(s)) in the conference room during the video conference. In another non-limiting example, the local device 106 can be configured (e.g., include any suitable dimension(s), length(s), width(s), height(s), and/or shape(s)) for placement on a desk in a classroom during a hybrid classroom session so that the user of the remote attendee computing device (e.g., a remote student), when displayed on the local device 106, is at or appears to be at eye level or approximately at eye level with one or more attendees (e.g., local student(s)) in the classroom during the hybrid classroom session.

Figure 3A:
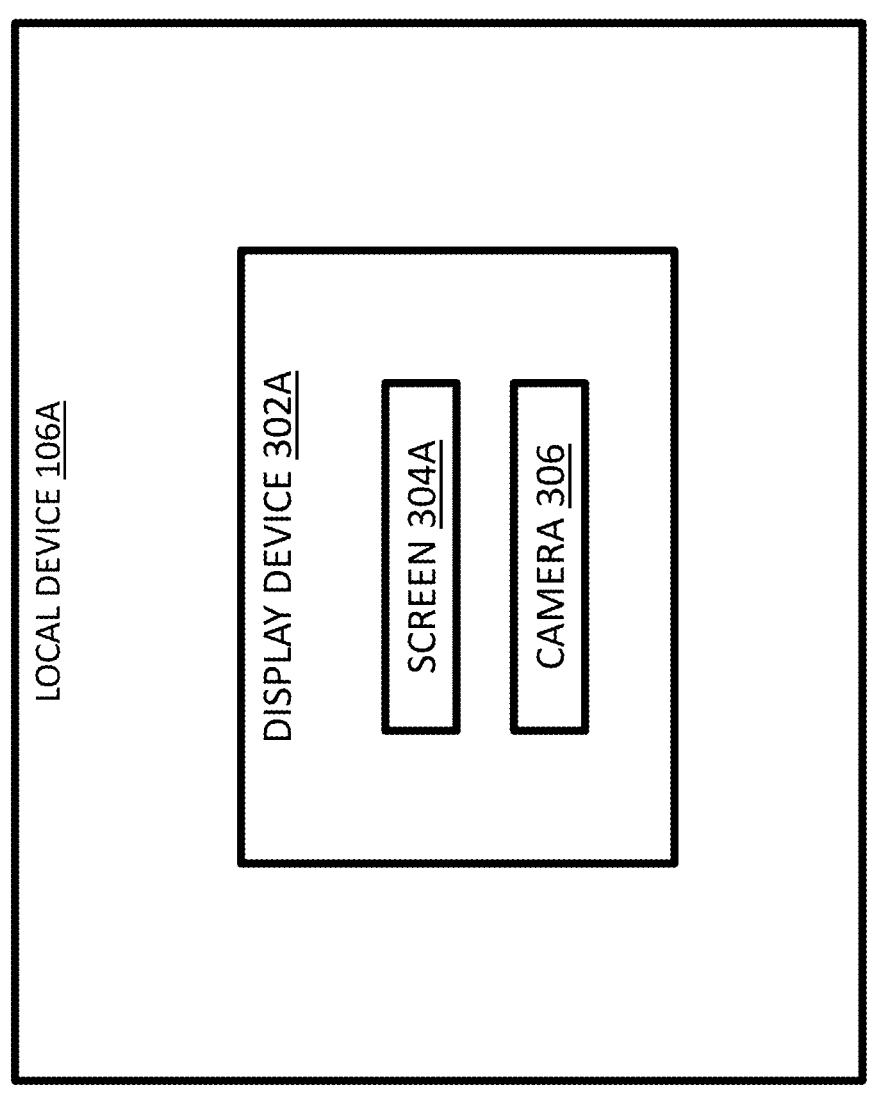
FIGS. 3A and 3B are schematic block diagrams of various embodiments of a local device included in the computing systems of FIGS. 1A through 1C.

With reference to FIG. 3A, a block diagram of one embodiment of a local device 106A is illustrated. At least in the illustrated embodiment, the local device 106A includes, among other components, a display device 302A with a screen 304A and a camera 306.

A display device 302A may include any suitable type of display that is known or developed in the future. In various embodiments, the display device 302A includes, among other components, a screen 304A.

The screen 304A may include any suitable type of screen that is known or developed in the future. In some embodiments, the screen 304A includes a convex shape such that display device 304A defines a convex display. In other embodiments, the screen 304A includes a flat shape or is flat such that display device 304A defines a flat display.

The screen 304A is configured to display the user of the remote attendee computing device 104 (or remote attendee) thereon. In some embodiments, the screen 304A is configured to display the remote attendee at different locations thereon based on where in the real-world environment the remote attendee is looking/focusing its gaze and/or desires to look. Here, as the remote attendee looks at different locations or persons in the real-world environment, the remote attendee will correspondingly move to/be displayed at different positions on the screen 304A. In other words, the remote attendee can appear to be facing the direction in which the remote attendee is looking/gazing at the moment that the remote attendee is doing such. Thus, if the remote attendee is focusing on a particular location or person in the real-world environment, the remote attendee can appear on the screen 304A at position that corresponds to the particular location or where the person in the real-world is located, but in a position that can be or may be off-center with respect to the center of the screen 304A when the particular location or where the person is located in the real-world environment is not in the center of the real-world environment even though the remote attendee may not have physically changed positions in its own location and/or real-world environment.

In video, the remote attendee can appear to be moving across the screen 304A as the remote attendee scans across and/or around the real-real environment. That is, as the remote attendee scans across and/or around the display 202 to view the real-world environment and/or object(s)/person(s) therein, the remote attendee will be dynamically displayed on the screen 304A at different locations and/or positions thereon in real-time.

Figure 4A:
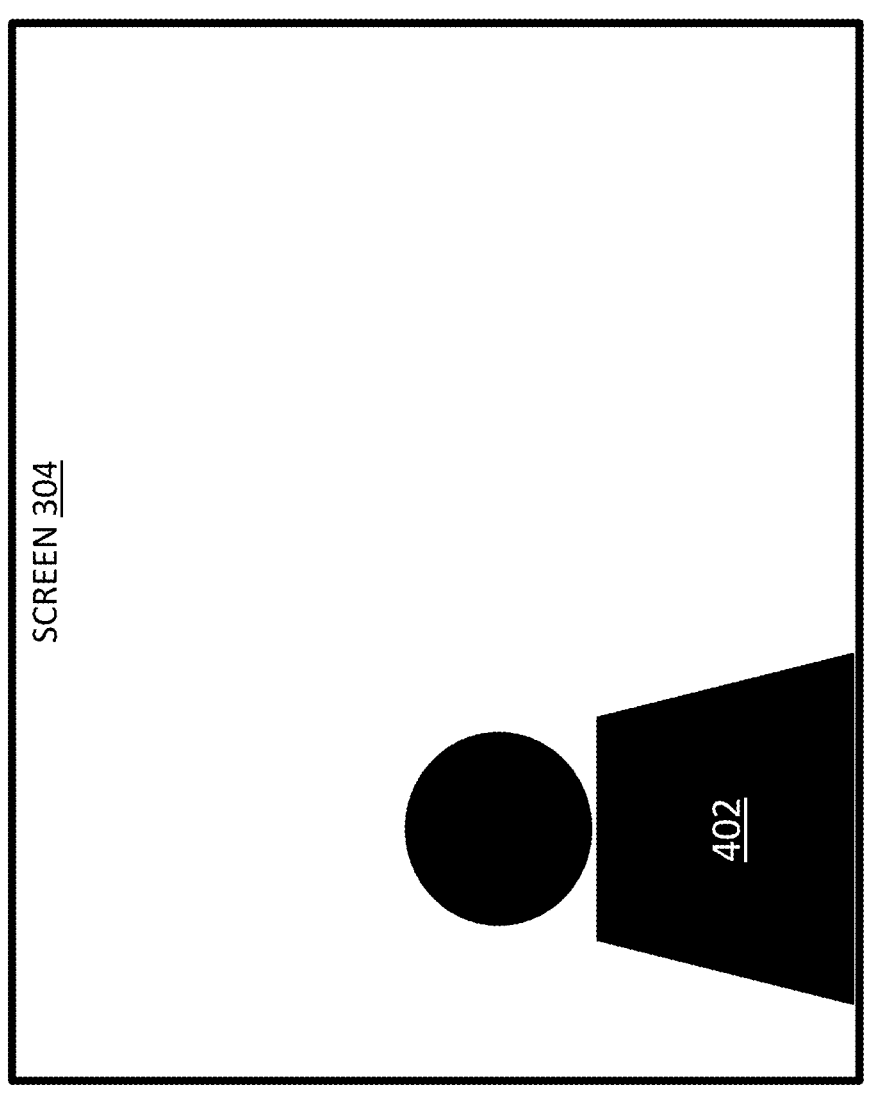
FIGS. 4A through 4C are diagrams illustrating a user being displayed at various positions/locations on a remote display device based on the user's viewing direction.
Figure 4B:
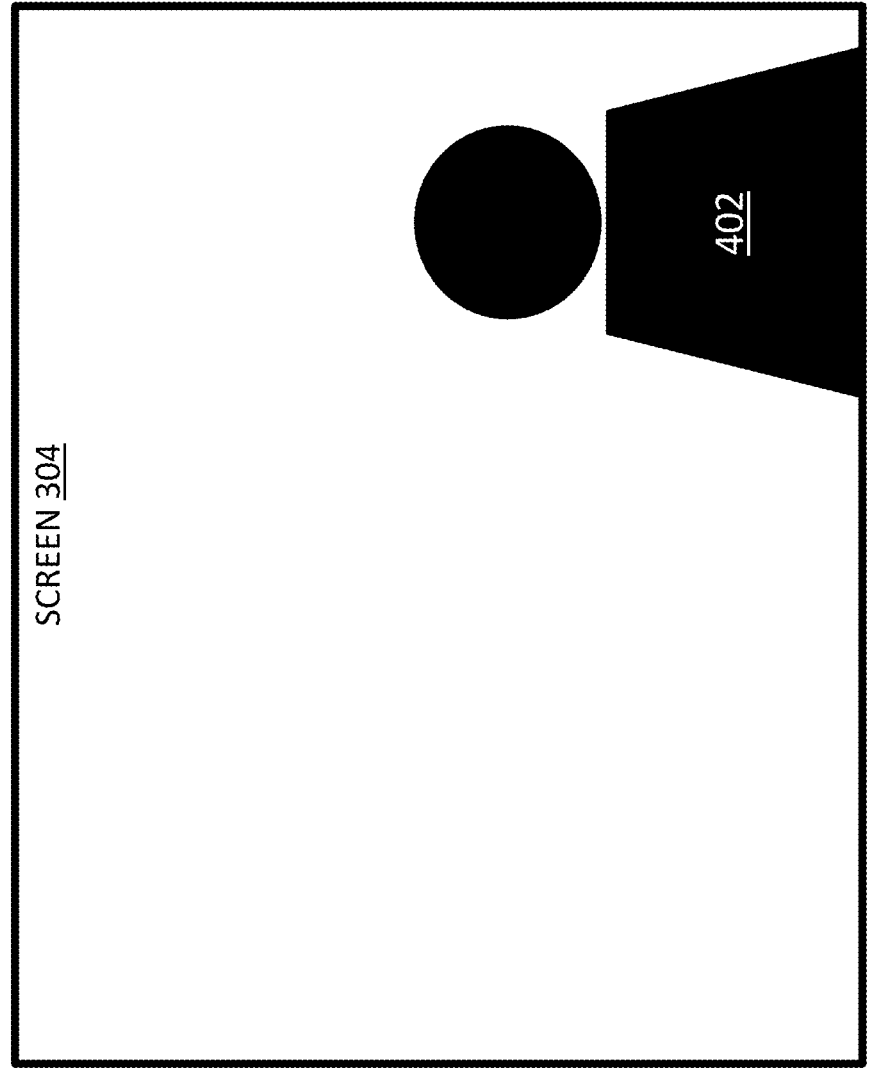
Figure 4C:
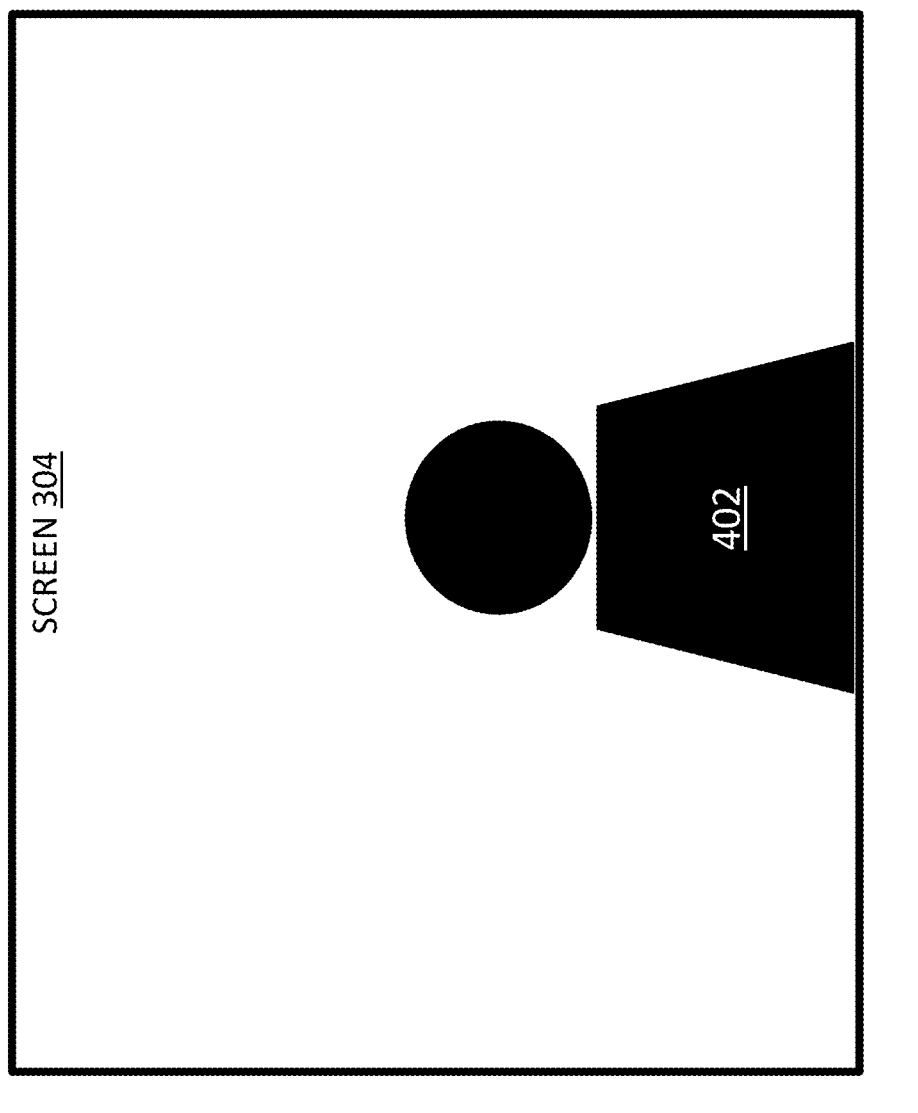

FIGS. 4A, 4B, and 4C illustrate examples of the operations and/or functions of the display device 302A in accordance with one embodiment. In FIG. 4A, the remote attendee 402 is shown on the left side of the screen 304A in response to determining/detecting that the remote attendee 402 looking at and/or desires to look toward a location or object on that side (e.g., a corresponding side, position, location, etc.) of the real-world environment (e.g., the real-world environment in which the screen 304A currently resides). Similarly, FIG. 4B shows the remote attendee 402 on the right side of the screen 304A in response to determining/detecting that the remote attendee 402 looking at and/or desires to look toward a location or object on that side (e.g., a corresponding side, position, location, etc.) of the real-world environment. Further, FIG. 4C shows the remote attendee 402 in the center of the screen 304A in response to determining/detecting that the remote attendee 402 looking at and/or desires to look toward a location or object in the middle or center (e.g., a corresponding middle/center, position, location, etc.) of the real-world environment.

For a convex screen 304A, the remote attendee 402 will be positioned on and/or move along the curvature of the convex screen in response to changes in the direction at which the remote attendee 402 is looking/gazing and/or desires to look/gaze. For a flat screen 304A, the remote attendee 402 will be positioned on and/or move horizontally across the flat screen in response to changes in the direction at which the remote attendee 402 is looking/gazing and/or desires to look/gaze.

With reference again to FIG. 3A, a camera 306 may include any suitable camera and/or type of camera that is known or developed in the future. That is, the camera 306 a capture images and/or video of the real-world environment for transmission to the remote computing device 104 and/or display 202 for display thereon.

In certain embodiments, the camera 306 includes an artificial intelligence (AI) camera. In some embodiments, the AI camera 306 can detect and/or determine which person is performing an action (e.g., speaking) and automatically focus on the actor (speaker). Here, the focused image(s) and/or video generated by the AI camera 306 can be transmitted to the remote computing device 104 and/or display 202 for display thereon. With the focused image(s) and/or video displayed on the remote computing device 104 and/or display 202, the remote attendee can, by default, be looking in the direction of the actor, which will in turn cause the remote attendee to be displayed on the display 302A and/or screen 304A at the position thereon corresponding to the location of the actor in the real-world environment.

Figure 3B:
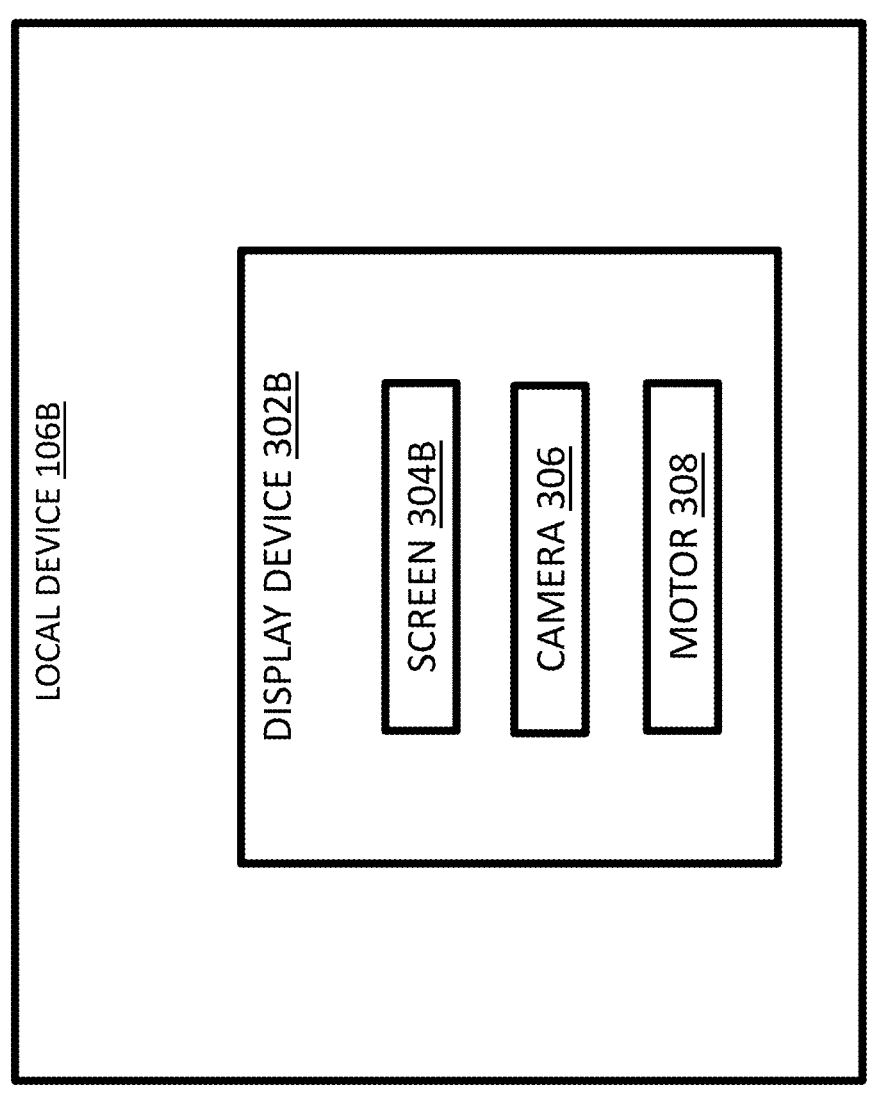

Referring to FIG. 3B, another embodiment of a local device 106B. At least in the illustrated embodiment, the local device 106B includes, among other components, a display device 302B including a screen 304B, a camera 306, and a motor 308.

The display device 302B and screen 304B, in various embodiments, is/are similar to the various embodiments of the display device 302A and screen 304A discussed above with reference to the local device 106A illustrated in FIG. 3A. In other embodiments, the display device 302B and screen 304B can statically display the remote attendee at any location/position (e.g., center, bottom center, top center, etc.) on the display device 302B and/or screen 304B.

The motor 308, may include any suitable device and/or mechanism that can rotate the display device 302B and/or screen 304B and/or cause the display device 302B and/or screen 304B to be rotated. The motor 308 can rotate and/or cause the display device 302B and/or screen 304B to be rotated in response to where in the real-world environment the remote attendee is looking/focusing its gaze and/or desires to look.

In various embodiments, in response to the remote attendee looking at different locations or persons in the real-world environment, the display device 302B and/or screen 304B will be correspondingly rotated and/or moved by the motor 308 so that the remote attendee can appear to be facing the direction in which the remote attendee is looking/gazing at the moment that the remote attendee is doing such. Thus, if the remote attendee is focusing on a particular location or object/person in the real-world environment, the motor 308 will rotate or cause the display device 302B and/or screen 304B to be rotated a corresponding amount and/or to a corresponding position so that the remote attendee can appear to be looking in the direction of the particular location or where the object/person is located in the real-world environment.

Here, the remote attendee can be positioned in the center of the display device 302B and/or screen 304B as the motor 308 rotates or causes the display device 302B and/or screen 304B to be rotated, among other locations and/or positions on the display device 302B and/or screen 304B that are possible, each of which is contemplated herein. Alternatively, the remote attendee (e.g., remote attendee 402) can be positioned differently on the display device 302B and/or screen 304B in accordance with the location/direction the remote attendee is looking (see, e.g., the examples shown in FIGS. 4A through 4C) as the motor 308 rotates or causes the display device 302B and/or screen 304B to be rotated.

The camera 306 may be similar to the camera 306 discussed with reference to the local device 106A, which, in certain embodiments, can include an AI camera. In some embodiments, the AI camera 306 can detect and/or determine which person is performing an action (e.g., speaking) and automatically focus on the actor (speaker). Here, the focused image(s) and/or video generated by the AI camera 306 can be transmitted to the remote computing device 104 and/or display 202 for display thereon. With the focused image(s) and/or video displayed on the remote computing device 104 and/or display 202, the remote attendee can, by default, be looking in the direction of the actor, which will in turn cause the remote attendee to be displayed on the display 302B and/or screen 304B at the position thereon corresponding to the location of the actor in the real-world environment. Additionally, or alternatively, with the focused image(s) and/or video displayed on the remote computing device 104 and/or display 202, the remote attendee can, by default, be looking in the direction of the actor, which will in turn cause the motor 308 to rotate or cause the display 302B and/or screen 304B to be rotated so that the remote attendee faces the corresponding location of the actor in the real-world environment.

With reference again to FIG. 1A, a host 108 may include any suitable computer hardware and/or software that can display a remote attendee on a local display device at a position thereon based on the remote attendee's viewing direction. In various embodiments, a host computing device 108 can include one or more processors, computer-readable memory, and/or one or more interfaces, among other features and/or hardware. A host computing device 108 can further include any suitable software component or module, or computing device(s) that is/are capable of hosting and/or serving a software application or services, including distributed, enterprise, and/or cloud-based software applications, data, and services. For instance, a host computing device 108 can be configured to host, serve, or otherwise manage video conferences, or applications interfacing, coordinating with, or dependent on or used by other services, including video conference applications and software tools for monitoring the behavior of attendees of a video conference. In some instances, a host 108 can be implemented as some combination of devices that can comprise a common computing system and/or device, server, server pool, or cloud computing environment and share computing resources, including shared memory, processors, and interfaces.

Figures 5A, 5B:
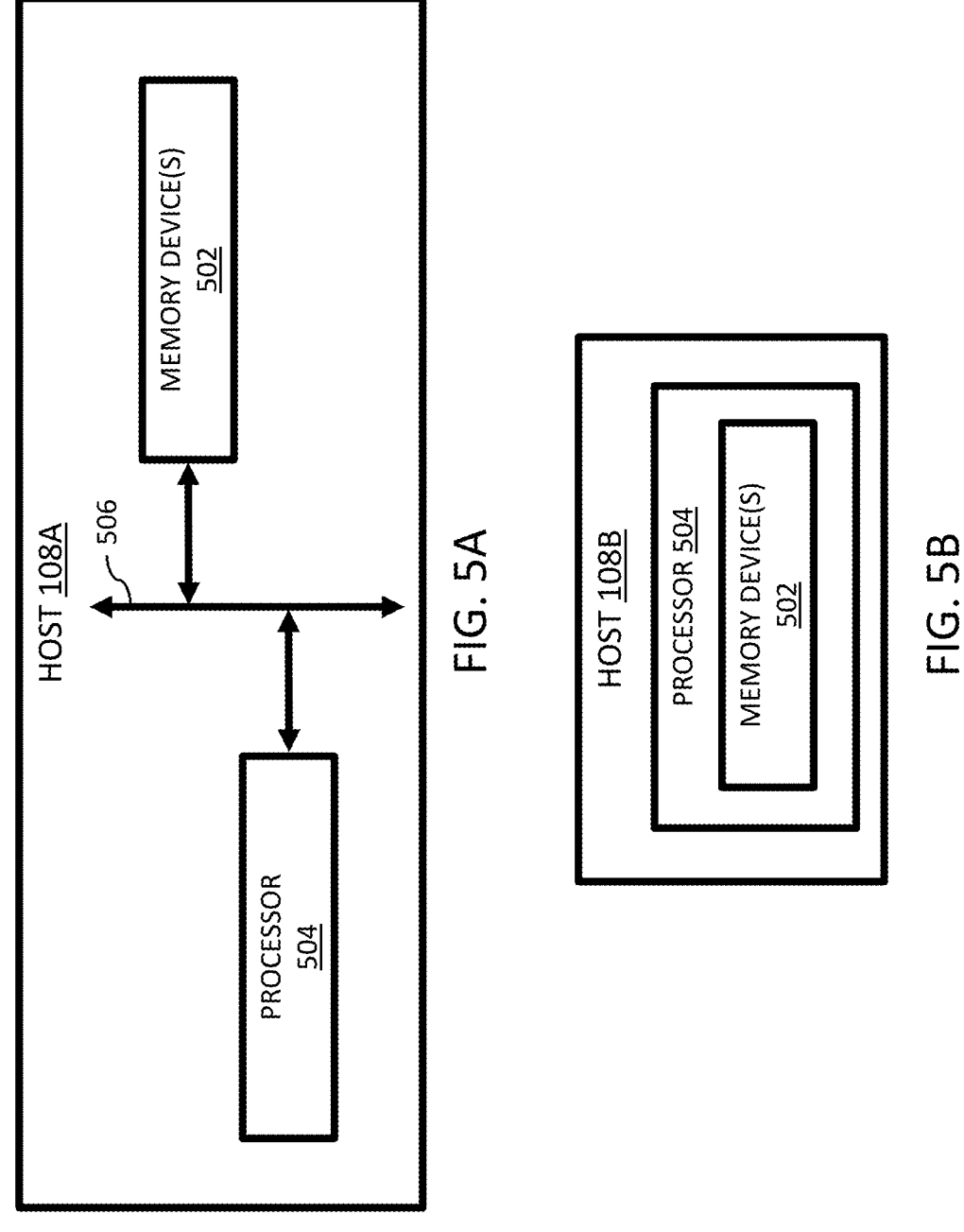
FIGS. 5A and 5B are schematic block diagrams of various embodiments of host computing device included in the computing system of FIGS. 1A through 1C.

Referring to FIG. 5A, FIG. 5A is a block diagram of one embodiment of a host 108A. At least in the illustrated embodiment, the host 108A includes, among other components, a set of one or more memory devices 502 and a processor 504 coupled to and/or in communication with one another via a bus 506 (e.g., a wired and/or wireless bus).

A set of memory devices 502 may include any suitable quantity of memory devices 502. Further, a memory device 502 may include any suitable type of device and/or system that is known or developed in the future that can store computer-useable and/or computer-readable code. In various embodiments, a memory device 502 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 504).

A memory device 502, in some embodiments, includes volatile computer storage media. For example, a memory device 502 may include RAM, including DRAM, SDRAM, and/or SRAM. In other embodiments, a memory device 502 includes non-volatile computer storage media. For example, a memory device 502 may include a hard disk drive, a flash memory, and/or any other suitable non-volatile computer storage device that is known or developed in the future. In various embodiments, a memory device 502 includes both volatile and non-volatile computer storage media.

Figure 6A:
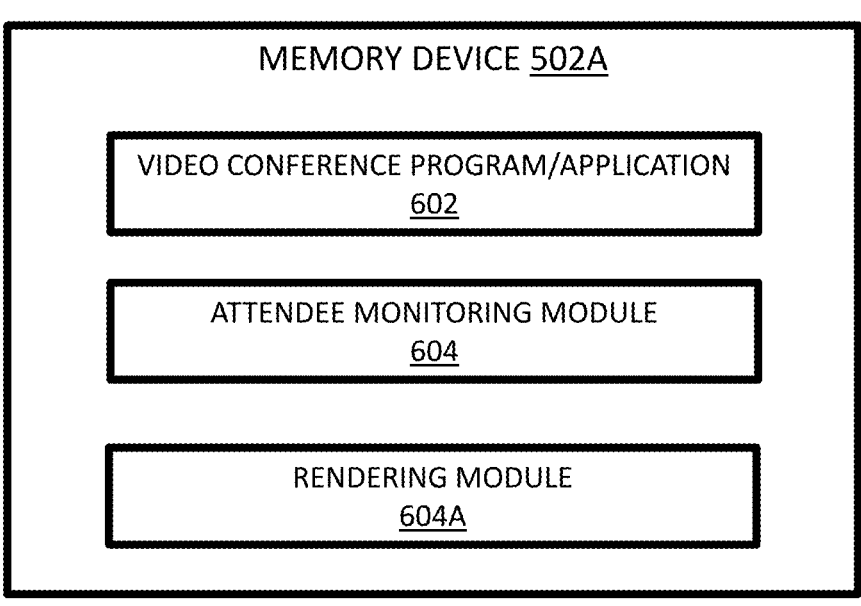
FIGS. 6A and 6B are schematic block diagram of various embodiments of a memory device included in the host computing devices of FIGS. 5A and 5B.

With reference now to FIG. 6A, FIG. 6A is a schematic block diagram of one embodiment of a memory device 502A. At least in the illustrated embodiment, the memory device 502A includes, among other components, a video conferencing platform 602, an attendee monitoring module 604, and a rendering module 606A that are each configured to operate/function in conjunction with one another when executed by the processor 504 to monitor the behavior of attendees of a video conference.

A video conferencing platform 602 may include any suitable commercial and/or private video conferencing program and/or application that is known or developed in the future. In various embodiments, a video conferencing platform 602 is configured to transmit the video feeds and/or video streams generated by the attendee computing device 104 and the local device 106 to one another. Examples of a video conferencing platform 602 include, but are not limited to, Microsoft Teams®, Zoom®, Google Meet®, Cisco Webex®, GoToMeeting®, Skype®, LanSchool®, Google Classroom™, Blackboard®, etc., and/or the like video conferencing platforms, programs, and/or applications, each of which is contemplated herein. In some embodiments, the video conferencing platform 602 can include an enterprise and/or proprietary video conferencing platform, program, and/or application.

The video feed and/or video stream generated by each attendee computing device 104 (e.g., a source computing device) and the moderator computing device 108 can include audio and/or video of its user (e.g., attendee) and/or written/digital messages input by the user/attendee. The audio, video, and/or messages of each user of an attendee computing device 104 can represent and/or convey the behavior(s) of the user (e.g., a student, worker, colleague, peer, etc.) of an attendee computing device 104.

An attendee monitoring module 604 may include any suitable hardware and/or software that can monitor a remote attendee of a video conference via a video feed and/or video stream received from the attendee computing device 104. In various embodiments, the attendee monitoring module 604 is configured to monitor a remote attendee of a video conference by searching, in real-time, the video feed and/or video stream for visual cues of the remote attendee and/or user inputs from the remote attendee.

In various embodiments, the attendee monitoring module 604 is configured to track, in real-time, the eye(s) and/or gaze of the user in the remote attendee's video feed and/or video stream track and correlate the direction of the remote attendee's eye(s)/gaze with a direction, location, and/or object in the real-world environment where the event is occurring. Here, the attendee monitoring module 604 can correlate the location on the display 202 where the user is currently looking and a corresponding direction, location, and/or object in the real-world environment where the remote attendee desires to view and/or an object (e.g., a person) that the remote attendee is focusing the remote attendee's gaze/eye(s) and/or attention.

In embodiments that utilize an AI camera (e.g., camera 306), the attendee monitoring module 604 can, automatically and/or by default, correlate the direction of the remote attendee's eye(s)/gaze with an actor performing an action in the real-world environment. For example, an AI camera 306 may automatically focus on a person that is currently speaking (a speaker) and, because the speaker can be automatically displayed on a display device 202, the attendee monitoring module 604 can automatically and/or by default determine that the remote attendee "desires" to view the speaker and/or that the remote attendee is focusing the remote attendee's gaze/eye(s) and/or attention on the speaker.

In additional or alternative embodiments, the attendee monitoring module 604 is configured to utilize the user inputs received via the input device(s) 206 to correlate the direction where the remote attendee is viewing and/or desires to view with a direction, location, and/or object in the real-world environment where the event is occurring. Here, the location on the display 202 where the remote attendee is actuating the input device(s) 206 in performing the user inputs can represent a location in the real-world environment where the remote attendee desires to view and/or an object (e.g., a person) that the remote attendee desires to focus the remote attendee's gaze/eye(s) and/or attention.

Consistent with the non-limiting example above, the attendee monitoring module 604 can determine where the remote attendee is currently looking using the motion, direction, velocity, and/or acceleration of the remote attendee's head (and/or eye(s)) when using a VR/AR headset or smart glasses, etc. and correlate the user input(s) with a direction, location, and/or object in the real-world environment that the remote attendee desires to view and/or is currently focusing the remote attendee's attention. Additionally, or alternatively, the attendee monitoring module 604 can determine where the remote attendee is currently looking or desires to view via mouse inputs on the display 202 correlate the mouse input(s) with a direction, location, and/or object in the real-world environment that the remote attendee desires to view and/or is currently focusing the remote attendee's attention. Further additionally, or alternatively, the attendee monitoring module 604 can determine where the remote attendee is currently looking or desires to view via touchscreen inputs on a touchscreen display 202 and correlate the touchscreen inputs or touch inputs with a direction, location, and/or object in the real-world environment that the remote attendee desires to view and/or is currently focusing the remote attendee's attention.

In certain embodiments, the attendee monitoring module 604 is configured to notify and/or transmit a notification to a rendering module 606A in response to the attendee monitoring module 604 determining/detecting where in the real-world environment the remote attendee wants view and/or focusing the remote attendee's attention. Here, the notification can identify a location, object, and/or actor in the real-world environment that the remote attendee wants view and/or is focusing the remote attendee's attention.

A rendering module 606A may include any suitable hardware and/or software that can display the remote attendee on a local device 106A or 106B (or simply a local device 106), display device 302A or 302B (or simply a display 302), and/or screen 304A or 304B (or simply a screen 304) and/or cause the remote attendee to be displayed on the local device 106, display device 302, and/or screen 304. Various embodiments of the rendering module 606A may display the remote attendee and/or cause the remote attendee to be displayed on the local device 106, display device 302, and/or screen 304 in a manner consistent with any of the embodiments that can statically or dynamically display the remote attendee disclosed herein.

The rendering module 606A, in various embodiments, is configured to receive a signal and/or notification from the attendee monitoring module 604. The signal and/or notification from the attendee monitoring module 604 indicates where in the real-world environment the remote attendee wants view and/or is currently focusing the remote attendee's attention. Further, the rendering module 606A is configured to display the remote attendee or cause the remote attendee to be displayed at different locations on a local device 106, display device 302, and/or screen 304 in response to receiving the signal and/or notification from the attendee monitoring module 604.

In various embodiments, the rendering module 606A is configured to display the remote attendee or cause the remote attendee to be displayed at a particular location on the local device 106, display device 302, and/or screen 304 corresponding to a location and/or direction in the real-world environment where the remote attendee is currently looking/focusing its gaze and/or desires to look. Here, as the rendering module 606A receives a signal/notice from the attendee monitoring module 604 indicating where the remote attendee is currently looking/gazing and/or desires to focus its attention, the rendering module 606A display the remote attendee or cause the remote attendee to be displayed on the local device 106, display device 302, and/or screen 304 at a position/location thereon corresponding to the direction, location, and/or object within the real-world environment so that the remote attendee appears on the local device 106, display device 302, and/or screen 304 to be looking at/toward the corresponding direction, location, and/or object within the real-world environment. In other words, the remote attendee can appear to be facing the direction and/or object at which the remote attendee is looking/gazing and/or focusing its attention at the moment that the remote attendee is doing such. Thus, if the remote attendee is focusing on a particular location or person in the real-world environment, the remote attendee can appear on the local device 106, display device 302, and/or screen 304 at position that corresponds to the particular location or where the person in the real-world is located, as discussed elsewhere herein.

In video, as the rendering module 606A receives signals/notices from the attendee monitoring module 604 indicating where the remote attendee is currently looking/gazing and/or desires to focus its attention as the remote attendee scans the real-world environment via the display 202, the rendering module 606A can dynamically display the remote attendee or cause the remote attendee to be dynamically displayed on the local device 106, display device 302, and/or screen 304 so that the remote attendee appears to be moving across the screen 304A as the remote attendee scans across and/or around the real-real environment. That is, as the remote attendee scans across and/or around the display 202 to view the real-world environment and/or object(s)/person(s) therein, the rendering module 606A can display the remote attendee on the local device 106, display device 302, and/or screen 304 at different locations and/or positions thereon in real-time.

Figure 6B:
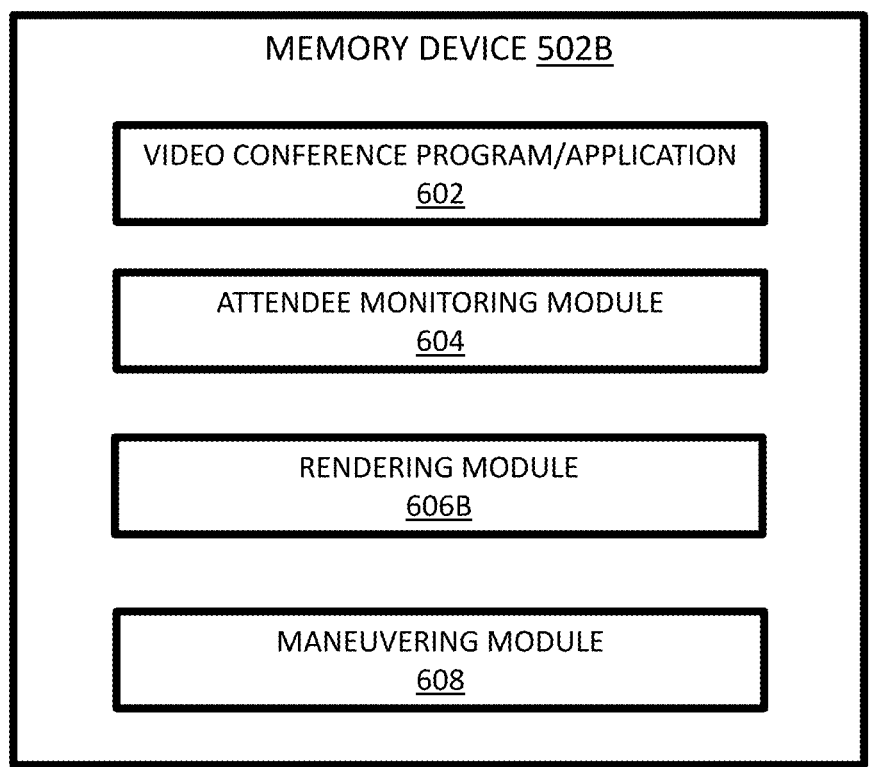

Referring to FIG. 6B, FIG. 6B is a schematic block diagram of another embodiment of a memory device 502B. The memory device 502B includes a video conferencing platform 602 and an attendee monitoring module 604 similar to the video conferencing platform 602 and attendee monitoring module 604 included in the memory device 502A. At least in the illustrated embodiment, the memory device 502B further includes, among other components, a rendering module 606B and a maneuvering module 608.

The rendering module 606B may including all of the operations and/or functionality of the various embodiments of the rendering module 606A discuss with reference to the memory device 502A. In additional or alternative embodiments, the rendering module 606B can statically display the remote attendee or cause the remote attendee to be statically displayed on the local device 106, display device 302, and/or screen 304. Here, the rendering module 606A can statically display the remote attendee at any location/position (e.g., center, bottom center, top center, etc.) on the local device 106, display device 302, and/or screen 304.

In certain embodiments, the attendee monitoring module 604 is configured to notify and/or transmit a notification to the rendering module 606B in response to the attendee monitoring module 604 determining/detecting where in the real-world environment the remote attendee wants view and/or focusing the remote attendee's attention. Here, the notification can identify a location, object, and/or actor in the real-world environment that the remote attendee wants view and/or is focusing the remote attendee's attention.

A maneuvering module 608 may include any suitable hardware and/or software that can move and/or rotate the local device 106, display device 302, and/or screen 304 or cause the local device 106, display device 302, and/or screen 304 to move and/or rotate. Various embodiments of the maneuvering module 608 move/rotate the local device 106, display device 302, and/or screen 304 or cause the local device 106, display device 302, and/or screen 304 to be moved/rotated in response to the location, object, and/or actor in the real-world environment that the remote attendee wants view and/or is focusing the remote attendee's attention.

In various embodiments, the maneuvering module 608 can move/rotate the local device 106, display device 302, and/or screen 304 or cause the local device 106, display device 302, and/or screen 304 to be moved/rotated (via the motor 308) an amount and/or to a position corresponding to the location, direction, and/or object that the remote attendee desires to view and/or is focusing its attention. Here, the local device 106, display device 302, and/or screen 304 is rotated/moved or cause to do such so that the remote attendee can appear on the local device 106, display device 302, and/or screen 304 to be facing the direction, position, and/or object in the real-world environment at which the remote attendee is looking/gazing at the moment that the remote attendee is doing such. Thus, if the remote attendee desire to view and/or focus its attention on a particular location or object/person in the real-world environment, the maneuvering module 608 can control the motor 308 to rotate/move or cause the local device 106, display device 302, and/or screen 304 to be rotated/moved a corresponding amount and/or to a corresponding position so that the remote attendee can appear to be looking in the direction of the particular location or where the object/person is located in the real-world environment.

Here, the remote attendee can be positioned in the center of the local device 106, display device 302, and/or screen 304 as the motor 308 rotates/moves or causes the display device 302B and/or screen 304B to be rotated/moved, among other locations and/or positions on the display device 302B and/or screen 304B that are possible, each of which is contemplated herein. Alternatively, the remote attendee (e.g., remote attendee 402) can be positioned differently on the local device 106, display device 302, and/or screen 304 in accordance with the location/direction the remote attendee is looking (see, e.g., the examples shown in FIGS. 4A through 4C) as the motor 308 rotates/moves or causes the local device 106, display device 302, and/or screen 304 to be rotated/moved.

Referring back to FIG. 5A, a processor 504 may include any suitable non-volatile/persistent hardware and/or software configured to perform and/or facilitate performing various processing functions and/or operations. In various embodiments, the processor 504 includes hardware and/or software for executing instructions in one or more modules and/or applications. The modules and/or applications executed by the processor 504 can be stored on and executed from a memory device 502 and/or from the processor 504.

Figure 7A:
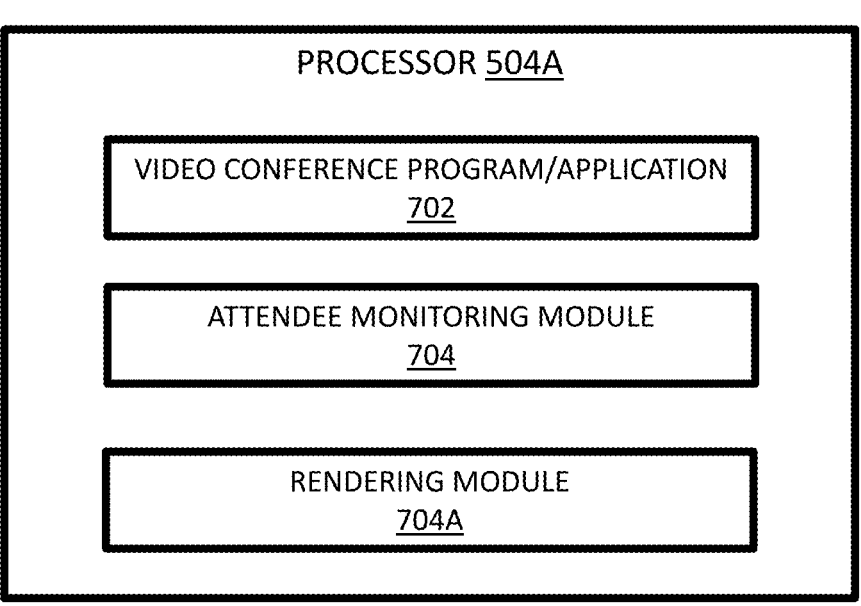
FIGS. 7A and 7B are schematic block diagram of various embodiments of a processor included in the host computing devices of FIGS. 5A and 5B.

With reference to FIG. 7A, FIG. 7A is a schematic block diagram of one embodiment of a processor 504A. At least in the illustrated embodiment, the processor 504A includes, among other components, a video conferencing platform 702, an attendee monitoring module 704, and a rendering module 706A similar to the video conferencing platform 602, attendee monitoring module 604, and a rendering module 606A discussed with reference to FIG. 6A.

Figure 7B:
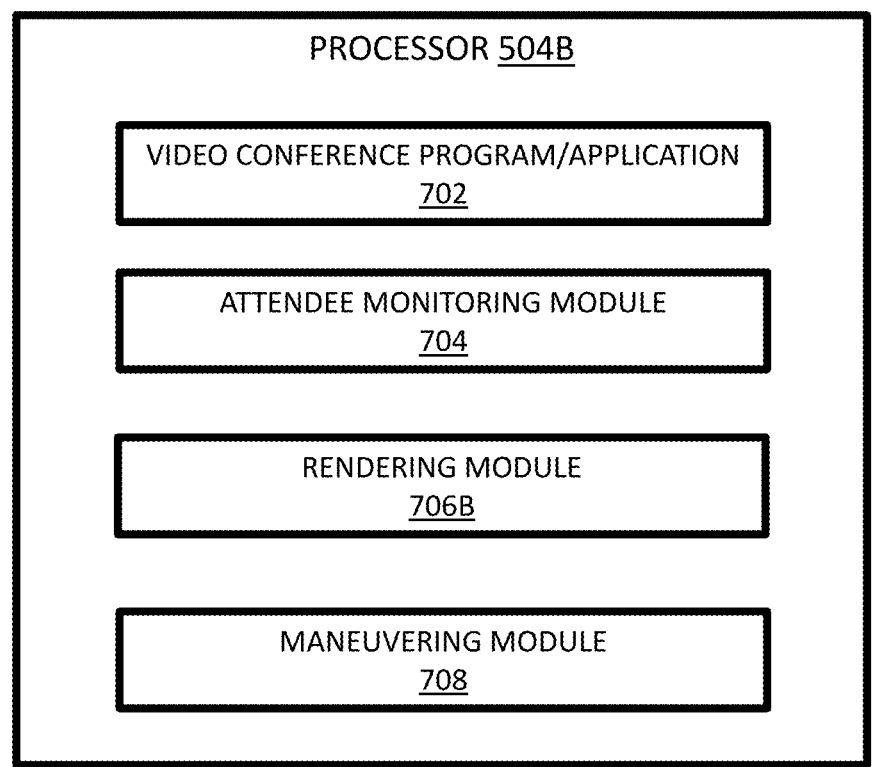

Referring to FIG. 7B, FIG. 7B is a schematic block diagram of another embodiment of a processor 504B. At least in the illustrated embodiment, the processor 504B includes, among other components, a video conferencing platform 702, an attendee monitoring module 704, a rendering module 706B, and a maneuvering module 708 similar to the video conferencing platform 602, attendee monitoring module 604, a rendering module 606B, and maneuvering module 608 discussed with reference to FIG. 6B.

Referring to FIG. 5B, FIG. 5B is a block diagram of another embodiment of host 108B. The host 108B includes, among other components, one or more memory devices 502 and a processor 504 similar to the host 108A discussed with reference to FIG. 5A. Alternative to the host 108A, the processor 504 in the host 108B includes the memory device(s) 502 as opposed to the memory device(s) 502 of the host 108A being a different device(s) than and/or independent of the processor 504.

Figure 1B:
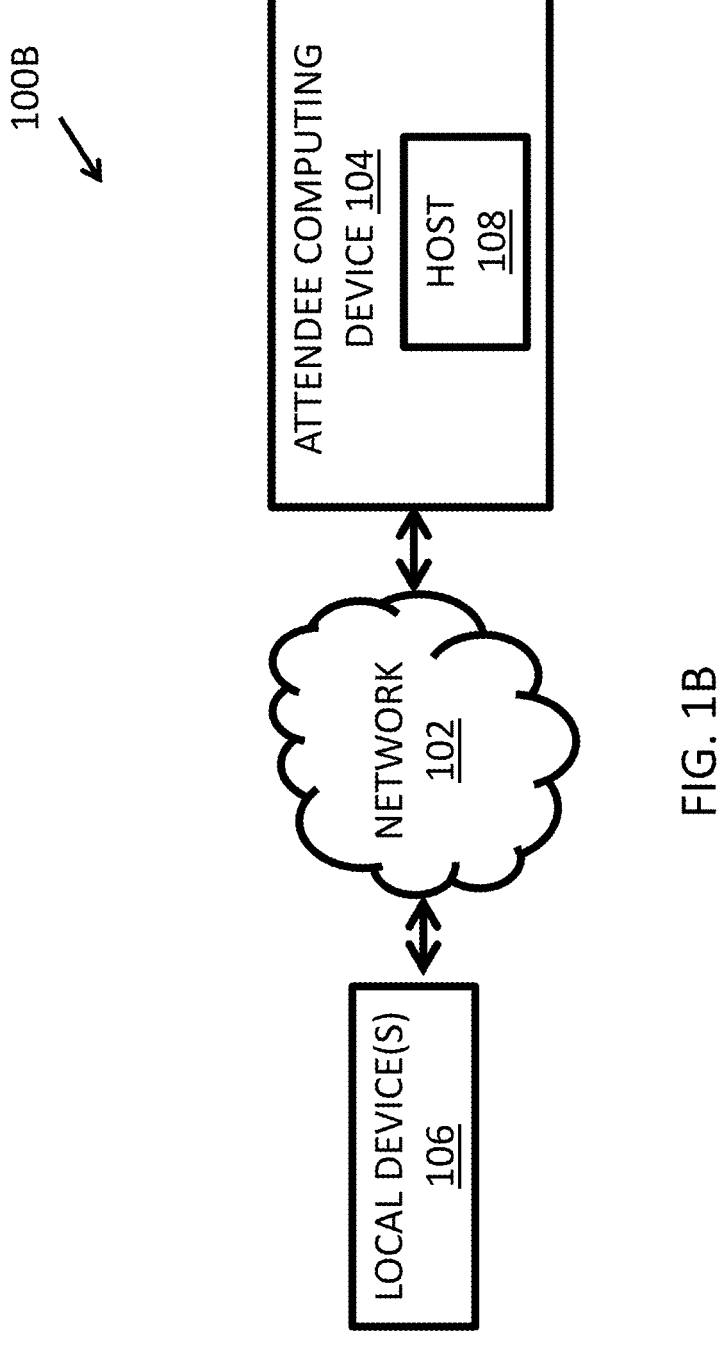

With reference to FIG. 1B, FIG. 1B is diagram of another embodiment of a computing system 100B that can display a user on a remote display device at a position based on the user's viewing direction. The computing system 100B includes, among other components, a network 102, a set of one or more attendee computing devices 104, a set of one or more local devices 106, and a host computing device 108 similar to the computing system 100A discussed with reference to FIG. 1A. Alternative to the computing system 100A, an attendee computing device 104 includes the host 108 as opposed to the host 108 being a different device than and/or independent of the attendee computing device 104.

Figure 1C:
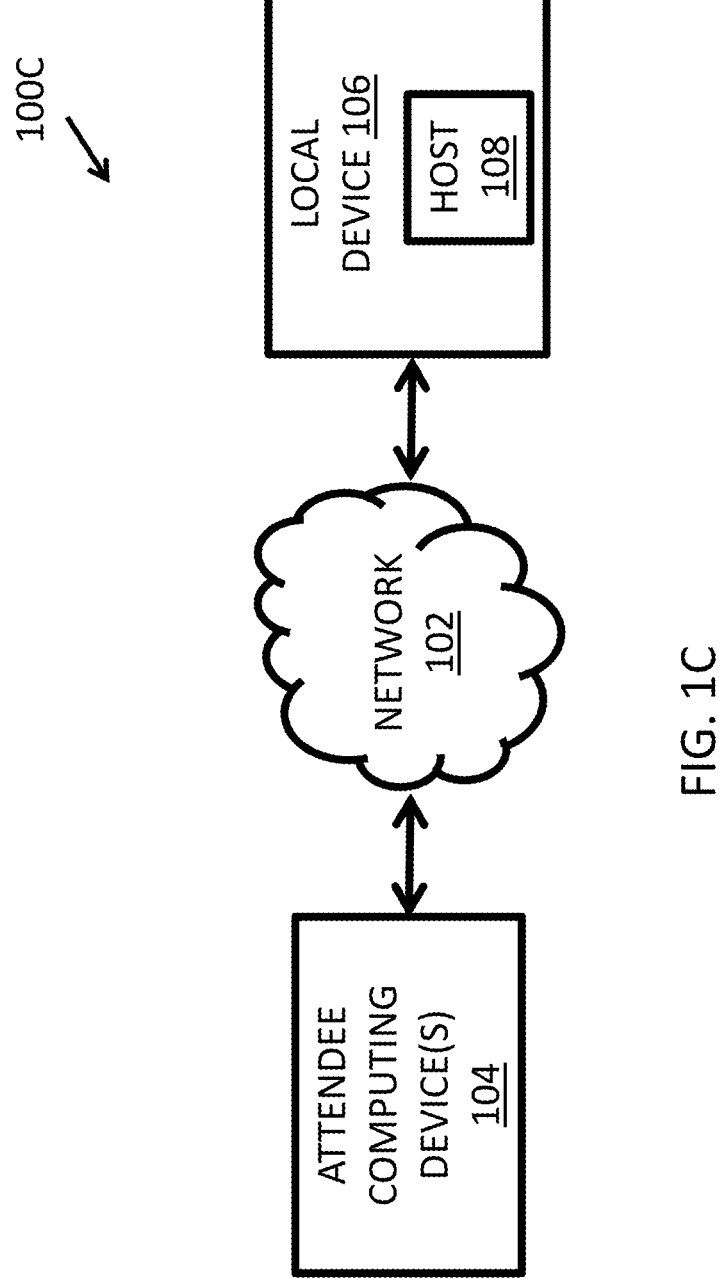

Referring to FIG. 1C, FIG. 1C is diagram of yet another embodiment of a computing system 100C that can display a user on a remote display device at a position based on the user's viewing direction. The computing system 100C includes, among other components, a network 102, a set of one or more attendee computing devices 104, a set of one or more local devices 106, and a host computing device 108 similar to the computing system 100A discussed with reference to FIG. 1A. Alternative to the computing system 100A, a local device 106 includes the host 108 as opposed to the host 108 being a different device than and/or independent of the local device 106.

Figure 8:
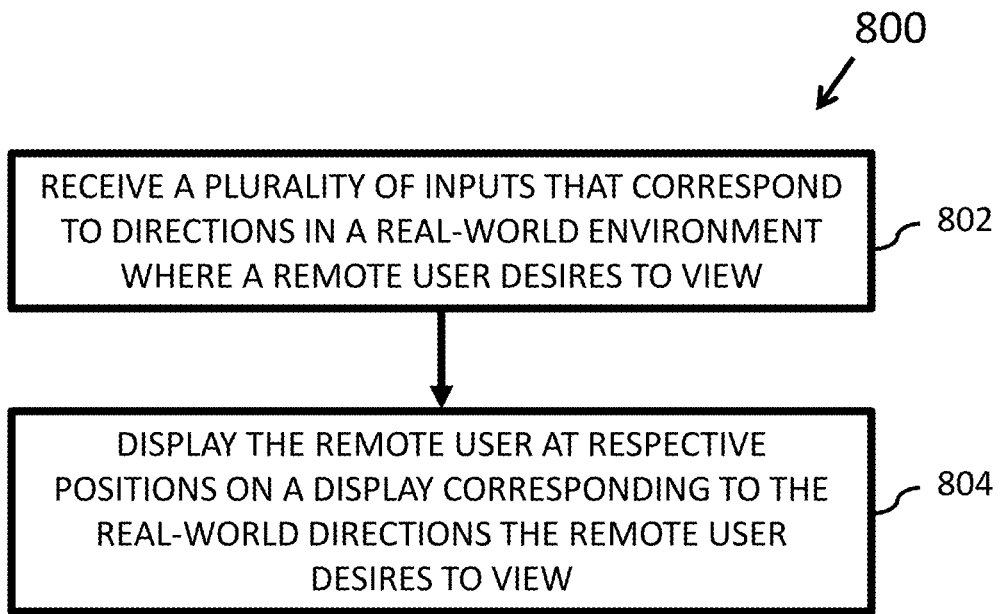

Referring to FIG. 8, FIG. 8 is a schematic flow chart diagram illustrating one embodiment of a method 800 for displaying a user on a remote display device at a position based on the user's viewing direction. At least in the illustrated embodiment, the method 800 begins by a processor (e.g., processor 504) receiving, from an attendee device 104 a plurality of inputs in which each input corresponds to a respective direction in the second real-world environment where a user of the remote attendee device 104 (e.g., a remote attendee) desires to view via the attendee device (block 802). Here, the remote attendee device 104 is located in a first real-world environment that is located remotely from a second real-world environment where an event is occurring.

The method 800 further includes displaying the remote attendee on a display device (e.g., display device 302) at a respective position on the display device 302 corresponding to the respective direction in the second real-world environment where the remote attendee desires to view in response to receiving each first input (block 804). Here, the display device is located in the second real-world environment, and the first real-world environment and the second real-world environment are different real-world environments.

With reference to FIG. 9, FIG. 9 is a schematic flow chart diagram illustrating another embodiment of a method 900 for displaying a user on a remote display device at a position based on the user's viewing direction. At least in the illustrated embodiment, the method 800 begins by a processor (e.g., processor 504) receiving, from an attendee device 104 a plurality of inputs in which each input corresponds to a respective direction in the second real-world environment where a user of the remote attendee device 104 (e.g., a remote attendee) desires to view via the attendee device (block 902). Here, the remote attendee device 104 is located in a first real-world environment that is located remotely from a second real-world environment where an event is occurring.

The method 900 further includes displaying the remote attendee on a display device (e.g., display device 302) at a respective position on the display device 302 corresponding to the respective direction in the second real-world environment where the remote attendee desires to view in response to receiving each first input (block 904). Here, the display device is located in the second real-world environment, and the first real-world environment and the second real-world environment are different real-world environments.

In some embodiments, the method 900 includes displaying the remote attendee at a first position on a curvature of a convex screen 304 corresponding to a first direction in the real-world environment in response to receiving each first input from the remote attendee device 104 that corresponds to the first direction (block 906). Method 900 further includes displaying the remote attendee at a second position on the curvature of the convex screen 304 corresponding to a second direction in the real-world environment in response to receiving each second input from the remote attendee device 104 that corresponds to the second direction (block 908). Here, the first direction in the real-world environment and the second direction in the real-world environment are different directions, and the first position on the curvature of the convex screen and the second position on the on the curvature on the convex screen are different positions on the curvature of the convex screen.

Referring to FIG. 10, FIG. 10 is a schematic flow chart diagram illustrating another embodiment of a method 1000 for displaying a user on a remote display device at a position based on the user's viewing direction. At least in the illustrated embodiment, the method 800 begins by a processor (e.g., processor 504) receiving, from an attendee device 104 a plurality of inputs in which each input corresponds to a respective direction in the second real-world environment where a user of the remote attendee device 104 (e.g., a remote attendee) desires to view via the attendee device (block 1002). Here, the remote attendee device 104 is located in a first real-world environment that is located remotely from a second real-world environment where an event is occurring.

The method 1000 further includes displaying the remote attendee on a display device (e.g., display device 302) at a respective position on the display device 302 corresponding to the respective direction in the second real-world environment where the remote attendee desires to view in response to receiving each first input (block 1004). Here, the display device is located in the second real-world environment, and the first real-world environment and the second real-world environment are different real-world environments.

In various embodiments, the method 1000 further includes displaying the remote attendee at a first horizontal position on a flat screen 304 corresponding to a first direction in the real-world environment in response to receiving each first input from the remote attendee device 104 that corresponds to the first direction (block 1006). Method 1000 also includes displaying the remote attendee at a second horizontal position on the flat screen 304 corresponding to a second direction in the real-world environment in response to receiving each second input from the remote attendee device 104 that corresponds to the second direction (block 1008). Here, the first direction in the real-world environment and the second direction in the real-world environment are different directions, and the first horizontal position on the flat screen and the second horizontal position on the flat screen are different horizontal positions on the flat screen.

With reference to FIG. 11, FIG. 11 is a schematic flow chart diagram illustrating another embodiment of a method 1100 for displaying a user on a remote display device at a position based on the user's viewing direction. At least in the illustrated embodiment, the method 1100 begins by a processor (e.g., processor 504) receiving, from an attendee device 104 a plurality of inputs in which each input corresponds to a respective direction in the second real-world environment where a user of the remote attendee device 104 (e.g., a remote attendee) desires to view via the attendee device (block 1102). Here, the remote attendee device 104 is located in a first real-world environment that is located remotely from a second real-world environment where an event is occurring.

The method 1100 further includes displaying the remote attendee on a display device (e.g., display device 302) at a respective position on the display device 302 corresponding to the respective direction in the second real-world environment where the remote attendee desires to view in response to receiving each first input (block 1104). Here, the display device is located in the second real-world environment, and the first real-world environment and the second real-world environment are different real-world environments.

In some embodiments, the method 1100 includes receiving an input from a camera (e.g., camera 306) that is located in the second real-world environment (block 1106). The input from the camera 306 can indicate a person in the second real-world environment that is currently performing an action (e.g., speaking).

The method 1100 also includes displaying the person in the second real-world environment that is currently performing the action on the user display device 202 in response to receiving the camera input (block 1108). In certain embodiments, the method 1100 further includes automatically displaying the remote attendee on the display device 302 at the respective position on the display device 302 corresponding to the respective direction in the second real-world environment where the person in the second real-world environment is currently performing the action is located in response to displaying the person in the second real-world environment that is currently performing the action on the user display device (block 1110).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
an apparatus including a processor and a memory coupled to the processor;
wherein the memory comprises instructions executable by the processor to cause the apparatus to:
 receive a plurality of first inputs from an attendee device that is located in a first real-world environment that is located remotely from a second real-world environment, wherein each first input corresponds to a respective direction in the second real-world environment where a user of the attendee device desires to view via the attendee device,
 in response to receiving each first input, display the user on a display device at a respective position on the display device corresponding to the respective direction in the second real-world environment where the user desires to view,
 receive a second input from a camera that is located in the second real-world environment, the second input indicating a person in the second real-world environment that is currently performing an action, and
 in response to receiving the second input, display the person in the second real-world environment that is currently performing the action on the user display device,
 wherein:
  the display device is located in the second real-world environment, and
  the first real-world environment and the second real-world environment are different real-world environments.

2. The system of claim 1, further comprising:
the display device;
wherein:
 the display device comprises a convex screen,
 the instructions executable by the processor cause the apparatus to at least:
  display the user at a first position on a curvature of the convex screen corresponding to a first direction in the second real-world environment in response to receiving each first input from the attendee device that corresponds to the first direction, and
  display the user at a second position on the curvature of the convex screen corresponding to a second direction in the second real-world environment in response to receiving each second input from the attendee device that corresponds to the second direction,
 the first direction in the second real-world environment and the second direction in the second real-world environment are different directions, and the first position on the curvature of the convex screen and the second position on the on the curvature on the convex screen are different positions on the curvature of the convex screen.

3. The system of claim 2, wherein the display device is configured for placement on a surface in the second real-world environment that is eye level with one or more persons present in the second real-world environment.

4. The system of claim 2, further comprising:
the attendee device;
wherein:
    the attendee device comprises one of a desktop computer, a laptop computer, an augmented reality (AR) headset, a virtual reality (VR) headset, smart glasses, a phone, or a tablet,
    the plurality of first inputs comprises first inputs automatically detected by the one of the desktop computer, laptop computer, AR headset, VR headset, smart glasses, phone, or tablet, and
    the automatically detected first inputs comprise one of a plurality of gaze directions of the user or a plurality of head movements of the user.

5. The system of claim 2, further comprising:
the attendee device;
wherein:
    the attendee device comprises one or more user input devices, and
    the plurality of first inputs comprises first inputs manually received from the one or more user input devices.

6. The system of claim 1, further comprising:
the display device;
wherein:
    the display device comprises a flat screen,
    the instructions executable by the processor cause the apparatus to at least:
        display the user at a first horizontal position on the flat screen corresponding to a first direction in the second real-world environment in response to receiving each first input from the attendee device that corresponds to the first direction, and
        display the user at a second horizontal position on the flat screen corresponding to a second direction in the second real-world environment in response to receiving each second input from the attendee device that corresponds to the second direction,
    the first direction in the second real-world environment and the second direction in the second real-world environment are different directions, and
    the first horizontal position on the flat screen and the second horizontal position on the flat screen are different horizontal positions on the flat screen.

7. The system of claim 1, further comprising:
the display device;
wherein:
    the display device is configured to rotate,
    the instructions executable by the processor cause the display device to:
        rotate to a first rotational position corresponding to a first direction in the second real-world environment in response to receiving each first input from the attendee device that corresponds to the first direction, and
        rotate to a second rotational position corresponding to a second direction in the second real-world environment in response to receiving each first input from the attendee device that corresponds to the second direction,
    the first direction in the second real-world environment and the second direction in the second real-world environment are different directions, and
    the first rotational position and the second rotational position are different rotational positions of the display device.

8. The system of claim 1, wherein:
the plurality of first inputs comprises first inputs automatically detected by the attendee device; and
the automatically detected first inputs comprise one of a plurality of gaze directions of the user or a plurality of head movements of the user.

9. The system of claim 1, wherein the plurality of first inputs comprises first inputs manually received by the attendee device.

10. The system of claim 1, wherein the instructions executable by the processor to further cause the apparatus to:
    in response to displaying the person in the second real-world environment that is currently performing the action on the user display device, automatically display the user on the display device at the respective position on the display device corresponding to the respective direction in the second real-world environment where the person in the second real-world environment is currently performing the action is located.

11. A method, comprising:
receiving, from an attendee device that is located in a first real-world environment that is located remotely from a second real-world environment, a plurality of first inputs, wherein each first input corresponds to a respective direction in the second real-world environment where a user of the attendee device desires to view via the attendee device;
in response to receiving each first input, displaying the user on a display device at a respective position on the display device corresponding to the respective direction in the second real-world environment where the user desires to view;
receiving a second input from a camera that is located in the second real-world environment, the second input indicating a person in the second real-world environment that is currently performing an action; and
in response to receiving the second input, displaying the person in the second real-world environment that is currently performing the action on the user display device,
wherein:
    the display device is located in the second real-world environment, and
    the first real-world environment and the second real-world environment are different real-world environments.

12. The method of claim 11, wherein the display device comprises a convex screen, the method further comprising:
    displaying the user at a first position on a curvature of the convex screen corresponding to a first direction in the second real-world environment in response to receiving each first input from the attendee device that corresponds to the first direction; and
    displaying the user at a second position on the curvature of the convex screen corresponding to a second direction in the second real-world environment in response to receiving each first input from the attendee device that corresponds to the second direction, wherein:

the first direction in the second real-world environment and the second direction in the second real-world environment are different directions, the first position on the curvature of the convex screen and the second position on the on the curvature on the convex screen are different positions on the curvature of the convex screen.

13. The method of claim 11, wherein the display device comprises a flat screen, the method further comprising:

displaying the user at a first horizontal position on the flat screen corresponding to a first direction in the second real-world environment in response to receiving each first input from the attendee device that corresponds to the first direction; and displaying the user at a second horizontal position on the flat screen corresponding to a second direction in the second real-world environment in response to receiving each first input from the attendee device that corresponds to the second direction, wherein:

the first direction in the second real-world environment and the second direction in the second real-world environment are different directions, and the first horizontal position on the flat screen and the second horizontal position on the flat screen are different horizontal positions on the flat screen.

14. The method of claim 11, further comprising:

in response to displaying the person in the second real-world environment that is currently performing the action on the user display device, automatically displaying the user on the display device at the respective position on the display device corresponding to the respective direction in the second real-world environment where the person in the second real-world environment is currently performing the action is located.

15. A non-transitory computer program product comprising a computer-readable storage device including code embodied therewith, the code executable by a processor to cause the processor to: receive, from an attendee device that is located in a first real-world environment that is located remotely from a second real-world environment, a plurality of first inputs, wherein each first input corresponds to a respective direction in the second real-world environment where a user of the attendee device desires to view via the attendee device; and display the user on a display device at a respective position on the display device corresponding to the respective direction in the second real-world environment where the user desires to view in response to receiving each first input, receive a second input from a camera that is located in the second real-world environment, the second input indicating a person in the second real-world environment that is currently performing an action, and in response to receiving the second input, display the person in the second real-world environment that is currently performing the action on the user display device, wherein: the display device is located in the second real-world environment, and the first real-world environment and the second real-world environment are different real-world environments.

16. The computer program product of claim 15, wherein: the display device comprises a convex screen; and the code executable by the processor further causes the processor to:

display the user at a first position on a curvature of the convex screen corresponding to a first direction in the second real-world environment in response to receiving each first input from the attendee device that corresponds to the first direction, and display the user at a second position on the curvature of the convex screen corresponding to a second direction in the second real-world environment in response to receiving each first input from the attendee device that corresponds to the second direction, wherein:

the first direction in the second real-world environment and the second direction in the second real-world environment are different directions, and the first position on the curvature of the convex screen and the second position on the on the curvature on the convex screen are different positions on the curvature of the convex screen.

17. The computer program product of claim 15, wherein:

the display device comprises a flat screen; and the code executable by the processor further causes the processor to:

display the user at a first horizontal position on the flat screen corresponding to a first direction in the second real-world environment in response to receiving each first input from the attendee device that corresponds to the first direction, and display the user at a second horizontal position on the flat screen corresponding to a second direction in the second real-world environment in response to receiving each second input from the attendee device that corresponds to the second direction, wherein:

the first direction in the second real-world environment and the second direction in the second real-world environment are different directions, and the first horizontal position on the flat screen and the second horizontal position on the flat screen are different horizontal positions on the flat screen.

18. The computer program product of claim 15, wherein the code executable by the processor further causes the processor to:

automatically display the user on the display device at the respective position on the display device corresponding to the respective direction in the second real-world environment where the person in the second real-world environment is currently performing the action is located in response to displaying the person in the second real-world environment that is currently performing the action on the user display device.

19. The method of claim 11, wherein the display device is configured for placement on a surface in the second real-world environment that is eye level with one or more persons present in the second real-world environment.

20. Computer program product of claim 15, wherein the display device is configured for placement on a surface in the second real-world environment that is eye level with one or more persons present in the second real-world environment.

* * * * *